(12) United States Patent
Kataoka et al.

(10) Patent No.: US 6,990,949 B2
(45) Date of Patent: Jan. 31, 2006

(54) COMBUSTION CONTROL APPARATUS FOR A DIESEL ENGINE

(75) Inventors: Motoshi Kataoka, Aki-gun (JP); Hiroshi Hayashibara, Aki-gun (JP); Yasuyuki Terazawa, Aki-gun (JP); Tomoaki Saito, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 286 days.

(21) Appl. No.: 10/397,829

(22) Filed: Mar. 27, 2003

(65) Prior Publication Data

US 2003/0217732 A1    Nov. 27, 2003

(30) Foreign Application Priority Data

Mar. 27, 2002    (JP)    ............... 2002-088138

(51) Int. Cl.
*F02B 3/00*    (2006.01)
(52) U.S. Cl. ............... 123/299; 123/295; 123/305
(58) Field of Classification Search ............... 123/295, 123/305, 299, 276, 568.21, 430, 435, 436; 60/278, 285, 301; 701/105
See application file for complete search history.

(56) References Cited

U.S. PATENT DOCUMENTS

| 5,732,554 A | * | 3/1998 | Sasaki et al. ............... 60/278 |
| 5,740,775 A | * | 4/1998 | Suzuki et al. ............... 123/299 |
| 6,338,245 B1 | * | 1/2002 | Shimoda et al. ............... 60/285 |

FOREIGN PATENT DOCUMENTS

| EP | 0 732 485 A2 | 9/1996 |
| EP | 1 035 315 A2 | 9/2000 |
| EP | 1 085 176 A2 | 3/2001 |
| EP | 1 298 308 A2 | 4/2003 |
| JP | 09-158810 | 6/1997 |
| WO | WO 99/42718 | 8/1999 |
| WO | WO 00/71886 A1 | 11/2000 |
| WO | WO 01/86128 A2 | 11/2001 |

OTHER PUBLICATIONS

Patent Abstracts of Japan vol. 2000, No. 4, Aug. 31, 2000 & JP 2000008929 A (Mitsubishi Heavy Ind Ltd), Jan. 11, 2000  Abstract .

* cited by examiner

*Primary Examiner*—Mahmoud Gimie
(74) *Attorney, Agent, or Firm*—Nixon Peabody LLP; Donald R. Studebaker

(57) ABSTRACT

To suppress deposition of fuel injected at an early timing on a wall surface for preventing the degradation in fuel efficiency and increase in the amount of harmful components in an exhaust gas, in a direct-injection diesel engine which controls the injector to cause a combustion configuration dominated by the compressive ignition of the premixture while the engine is in the premixed combustion region defined on a low load side. When fuel is injected at an early timing to form the premixture, at least one of the pulse width to be inputted into the injector and the fuel pressure is or are adjusted according to the change in the injection timing, and corrected according to the intake air temperature or the intake pressure. If an allowable pulse width is insufficient to inject fuel in the amount corresponding to a target torque, fuel is injected in a divided manner.

21 Claims, 17 Drawing Sheets

FIG. 13
(a)
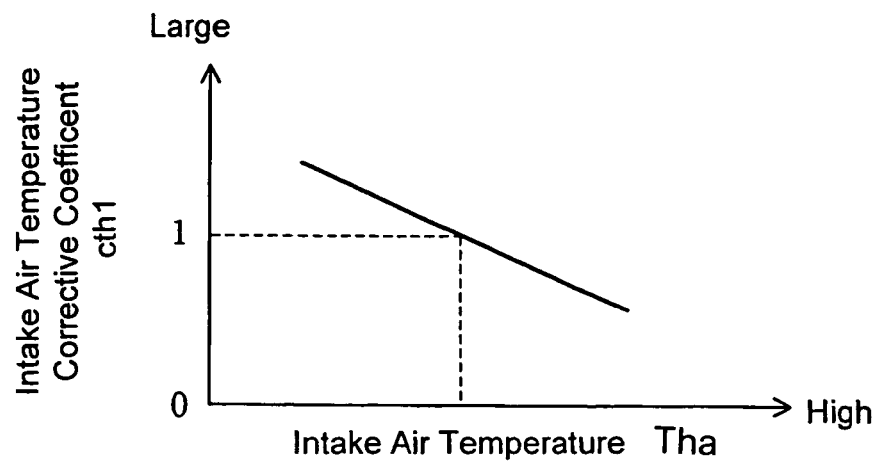
(b)
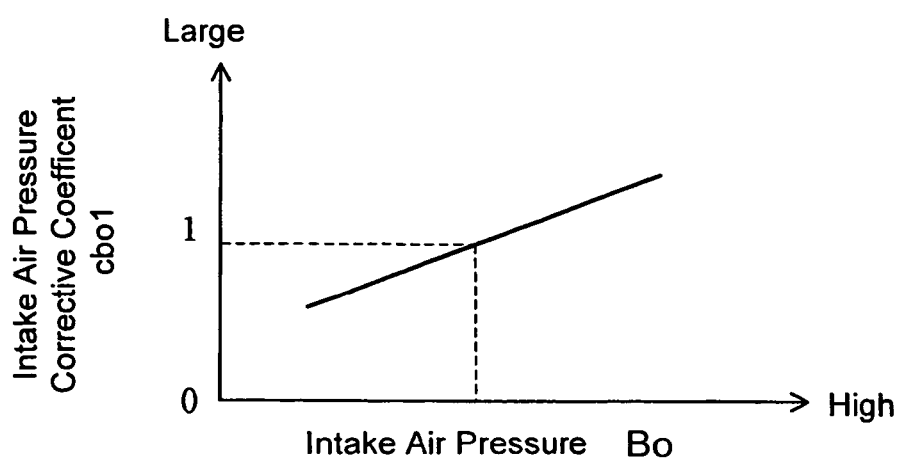

FIG. 17
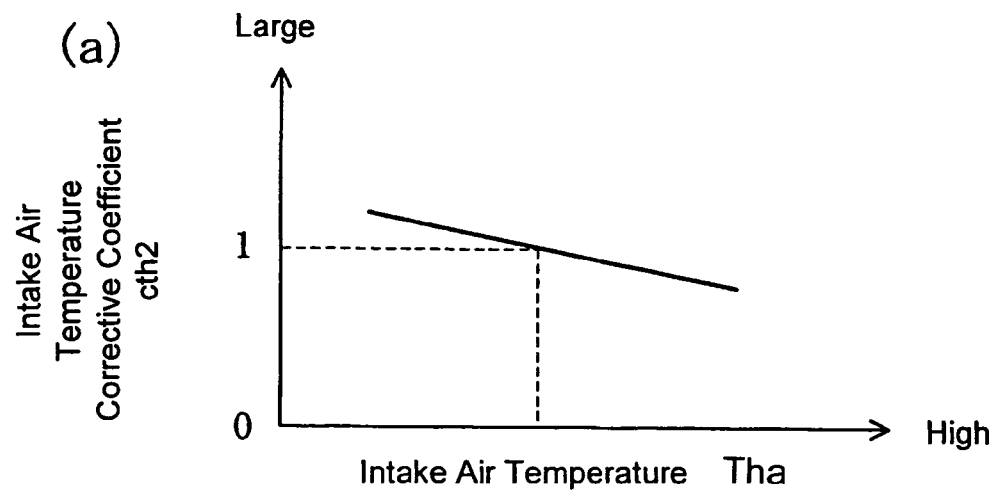
(a)
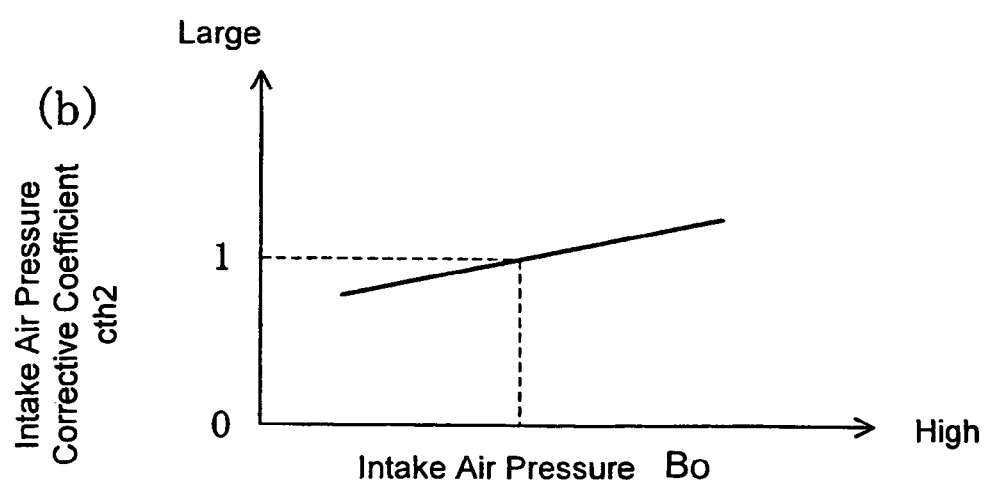
(b)

COMBUSTION CONTROL APPARATUS FOR A DIESEL ENGINE

BACKGROUND OF THE INVENTION

1. Field of the Invention

The present invention relates to a combustion control apparatus for a direct fuel injection diesel engine which directly injects fuel into a combustion chamber of a cylinder, and more particularly to early stage fuel injection where fuel injection is performed at a relatively advanced crank angle to generate a premixed air-fuel mixture, which causes premixed compressive ignition combustion in an operational region defined on a lower engine load side.

2. Description of the Related Art

Generally, a direct-injection diesel engine injects fuel into a combustion chamber at a high temperature and high pressure near the top-dead-center of a compression stroke in a cylinder so as to cause self-ignition of the fuel. At this time, the fuel injected into the combustion chamber progresses while being split into fine droplets (atomized) by the collision with highly dense air, so as to form an approximately cone-shaped fuel spray.

The fuel droplets vaporize from its surface and involves surrounding air mainly at the leading edge and its periphery of the fuel spray to form a mixture which starts combustion at the timing when the density and temperature of the mixture attains the condition required for ignition, i.e., premixed combustion. Then, the combustion shifts to diffusion combustion involving surrounding fuel vapor and air, at its core the ignition or combustion which has firstly occurred in the above-mentioned manner.

In such combustion of a conventional diesel engine (herein referred to as diesel combustion), the major part of fuel causes the diffusion combustion following the initial premixed combustion. At this time, however, in the fuel spray mixture which is heterogeneous in density, nitrogen oxide (NOx) is produced by the abrupt heat production at the portion where the excess air ratio λ is close to 1. Moreover, soot is produced by the shortage of oxygen at the portion where the fuel is unduly dense.

In this regard, conventionally, the recirculation of part of the exhaust gas to intake air, i.e., exhaust gas recirculation (EGR) or the boosting of fuel injection pressure are put into practice in order to reduce NOx and soot.

During the EGR, however, the recirculation of the inactive exhaust gas into the intake system decreases the combustion temperature to suppress the generation of NOx, but on the other hand, reduces the amount of oxygen in the intake air. Thus, a large amount of EGR results in the promotion of soot production. In addition, the boosted fuel injection pressure promotes atomization of fuel and increases fuel penetration to improve the fuel distribution and air-utilization ratio, which is capable of suppressing the generation of soot, but is likely to easily generate NOx. That is, because of the trade-off relationship between the reductions in NOx and soot, it is actually difficult to decrease both NOx and soot simultaneously during conventional diesel combustion.

To address this problem, a new combustion concept has been recently proposed, which significantly and concurrently reduces NOx and soot by greatly advancing the fuel injection timing to attain a combustion condition in which the ratio of the premixed combustion is larger than that of the diffusion combustion. For instance, Japanese publication of Patent Application No. 9-158810 discloses an apparatus that injects fuel within a time period from the compression stroke to the middle stage of the intake stroke of the cylinder.

The injected fuel is widely diffused in the combustion chamber in advance and sufficiently mixed with air to form a homogeneous mixture, which ignites and combusts at the end of the compression stroke.

The combustion concept of the proposed example as above (Japanese publication of Patent Application No. 9-158810) is called premixed compressive ignition combustion. The premixed compressive ignition combustion causes the homogeneous and lean mixture to combust at a relatively lower temperature, when a small amount of fuel is injected. Then, supposedly, neither NOx nor soot is produced. However, when the density of the mixture is increased by the additional fuel being injected, the rise in combustion temperature actively produces NOx, and the premixed mixture occasionally ignites at an unduly early timing prior to the top-dead-center of the compression stroke. Thus, the premixed compressive ignition combustion should not be performed when the engine is in the middle load condition or higher.

As described above, even when the premixed compressive ignition combustion can be performed in the low engine-load condition in order to reduce the NOx and soot productions in the direct injection diesel engine, the conventional diesel combustion should be performed reluctantly in the midge engine-load or high engine-load conditions. In this case, penetration should be so large that fuel can be injected in the combustion chamber at extremely high pressure near the top-dead-center of the compression stroke of the cylinder and the fuel spray can adequately progress in the dense air.

In the meantime, the fuel injection is executed at an early timing, for example, at the middle stage of the compression stroke, in the premixed compressive ignition combustion under low engine load condition. Then, the greater penetration of fuel spray will cause a part of fuel to reach an inner wall surface of the cylinder in the form of droplets and deposit there. This causes problems such as degradation in fuel efficiency, and a great increase in unburned hydrocarbon (HC) emission. Furthermore, the fuel deposited on the inner wall surface occasionally causes soot production.

SUMMARY OF THE INVENTION

An object of the present invention is to prevent fuel from depositing on the inner surface of the cylinder, to avoid resulting degradation in fuel efficiency and an increase in the amount of harmful components in the exhaust gas by increasing control during early time fuel injection for the formation of the premixed mixture in light of the great influence of the density of the surrounding gas on the penetration of fuel spray. The combustion apparatus of the present invention in a direct injection diesel engine controls the injector to inject fuel at least in one of the intake stroke or the compression stroke, so as to attain the combustion configuration, i.e., the compressive ignition combustion, in which the ratio of the premixed combustion is larger than that of the diffusion combustion in a predetermined operational condition.

According to a first aspect of the present invention, the object is achieved whereby, when the fuel injection is performed at an early timing, i.e., during the intake stroke or compression stroke, for forming the premixed mixture, at least one of the time period during which the injector opens its valve (valve opening duration) at the early timing injection, and the injection pressure of the fuel injected by the injector, is adjusted at least based on the density of the gas in the combustion chamber, so as to prevent the penetration of the fuel spray from becoming unduly strong.

According to these and other aspects of the present invention, there is provided a combustion control apparatus for a diesel engine comprising an injector disposed so as to extend into a combustion chamber of a cylinder of the engine, and an injection control device for controlling the injector to inject fuel at least in one of the intake stroke and the compression stroke, so as to attain a first combustion state where the ratio of the premixed combustion is larger than that of the diffusion combustion while the engine is in a predetermined operational condition.

The injection control device adjusts at least one of the time period during which the injector opens its valve and the injection pressure of the fuel injected by the injector, at least based on the density of the gas in the combustion chamber, while the engine is in the predetermined operational condition.

As a result, while the engine is in the predetermined operational region, the fuel injector which extends into the combustion chamber in the cylinder injects fuel at least in one of the intake stroke and compression stroke to attain the first combustion state where the ratio of the premixed combustion is larger than that of the diffusion combustion. That is, the fuel injected into the combustion chamber at the early timing, i.e., during the intake stroke or compression stroke, widely diffuses relatively over the combustion chamber to form a mixture being high in homogeneity, which ignites and combusts when the temperature in the combustion chamber rises at the late stage of the compression stroke.

In such a combustion state, by properly setting the injection timing so that the fuel adequately widely diffuses and mixes with air when the amount of fuel injection is not so large, the density of the mixture is reduced as a whole and the combustion configuration with a relatively low temperature is attained, similar to that disclosed in the proposed example described as above (Japanese publication of Patent Application No. 9-158810), thereby significantly suppressing the generation of NOx and soot due to the combustion of the mixture.

At that time, the injection control device controls at least one of the valve opening duration and the fuel injection pressure of the fuel injector during the early time injection as above, at least according to the density of the gas in the combustion chamber. Preferably, at least one of the controls performed is that the valve opening duration of the injector is shortened as the density of the gas in the combustion chamber decreases, and the fuel pressure is lowered as the density of the gas in the combustion chamber decreases.

Especially, because the penetration of fuel spray becomes larger for longer valve opening duration and for higher fuel injection pressure, and is generally inversely proportional to the square root of the density of the surrounding gas, the penetration is reduced by shortening the valve opening duration or lowering the fuel injection pressure by the injector, in the case where the density of the gas in the combustion chamber is relatively low and thus the penetration is likely to increase. This prevents unduly large penetration of the fuel spray to avoid the fuel deposition on the inner surface of the cylinder.

More preferably, at least one of the valve opening duration of the injector and the fuel injection pressure may be controlled so that the penetration of the fuel spray injected while the fuel injector continuously open becomes a value within a range predetermined based on the dimension in the radial direction of the cylinder.

That is, in general, the injector of the direct-injection diesel engine is often arranged at a portion corresponding to the substantially central portion of the cylinder. Thus, in light of the distance between the central portion and the inner surface of the cylinder, or the dimension in the radial direction of the cylinder and the direction of the travel of the fuel spray (the direction of the fuel injection), a value, being within the predetermined range by which the fuel spray extends sufficiently long without reaching the inner surface of the cylinder, can diffuse the fuel over the combustion chamber to improve homogeneity of the mixture while preventing fuel deposition on the wall surface, thereby favorably achieving the premixed combustion with a high air utilization ratio.

Further, preferably, while the engine is in the predetermined operational region, the injector may be preferably controlled to inject fuel within the term when the pressure of the gas in the combustion chamber is equal to or higher than a predetermined value in the compression stroke of the cylinder. This is because, when the pressure of the gas is a predetermined value or more, and the density of the gas in the combustion chamber is high to a certain degree in the compression stroke of the cylinder, the high pressure and density is likely to easily provide an adequate amount of penetration of the fuel spray.

According to the above, in the low load region having a small amount of fuel to be premixed, the fuel is preferably injected at a timing within the crank angle range between 90 and 30 degree prior to the top-dead-center of the compression stroke in the cylinder.

This is because unduly early injection of fuel in a relatively small amount provides so lean a mixture that the ignitability deteriorates. On the other hand, fuel injection after 30 degrees CA before top-dead-center of the compression stroke, enlarges the ratio of the diffusion combustion of the mixture as the injection timing is retarded, which increases soot production.

According to still another aspect of the invention, the injection control device may preferably control the injector to inject fuel in a divided manner with a plurality of shots when the amount of the fuel injection corresponding to a required torque exceeds the maximum fuel injection amount attainable within a valve opening duration of the injector.

This ensures the amount of fuel for providing the required torque of the engine, even when the required torque for the engine is relatively large and the corresponding fuel amount is impossible to inject during a single valve opening duration.

Moreover, the valve opening duration per divided shot is shortened to decrease each of the penetrations of the respective fuel sprays, thereby preventing the fuel from depositing on the wall surface, even with a large amount of fuel to be supplied per one combustion cycle of a cylinder. Furthermore, air stratums are interposed between the respective fuel sprays, hereby increasing the homogeneity of the mixture.

Preferably, in such a divided injection, the injection control device may control the injector so that the valve opening durations for the respective divided shots are prolonged for a higher retarded crank angle.

Especially, the ascending motion of the piston significantly changes the density of gas in the combustion chamber, such that the density is smaller for the advanced crank angle and higher for the retarded crank angle. Thus, by adjusting the valve opening durations corresponding to the respective divided shots, so as to be prolonged for the more advanced crank angle and shortened for the more retarded crank angle, the total amount of the fuel injection is increased while each of the penetration of the fuel spray corresponding to the respective valve opening durations are substantially equalized. That is, the fuel is prevented from depositing on the inner surface of the cylinder with sufficient amount of fuel injection, which enables the engine to attain the first combustion state in an enlarged operational condition up to the relatively high load operational condition.

More preferably, a combustion control apparatus may further comprise an exhaust gas recirculation passage for recirculating part of the exhaust gas into an intake passage of the engine, an exhaust gas recirculation amount regulator valve for adjusting the amount of the recirculated exhaust gas through the exhaust gas recirculation passage, and an exhaust gas recirculation control device for controlling the opening of the exhaust gas recirculation amount regulator valve.

This is because premixture during early time fuel injection as described above, may possibly cause the problem of an unduly early ignition prior to the top-dead-center of the compression stroke. Additionally, when the amount of fuel injection is relatively large, the overall density of the mixture rises and thus the combustion temperature increases, which may possibly cause the problem of increased NOx production.

To this, by the provision of an exhaust gas recirculation passage for recirculating part of the exhaust gas and mixing the recirculated exhaust gas with intake air (EGR), the ignition delay time of the mixture is prolonged to prevent the unduly early ignition, and moreover, the combustion temperature is lowered to suppress NOx production.

In this case, it is preferable that both the exhaust gas recirculation amount regulator valve for adjusting the amount of recirculated exhaust gas through the exhaust gas recirculation passage, and the exhaust recirculation gas control device for controlling the exhaust gas recirculation amount regulator valve, be provided for cooperatively adjusting the recirculation ratio of the exhaust gas to the intake air, in accordance with the engine operational condition.

This enables the ignition timing to be adjusted by the control of the ignition delay time through the control of the recirculation ratio of the exhaust gas, which achieves a heat generation characteristic with high heat efficiency for improved fuel efficiency.

Furthermore, the injection control device may be configured so as to control the injection timing of the injector according to the engine operational condition, and perform at least one of the controls of shortening the valve opening duration of the injector as the fuel injection timing is advanced and lowering the fuel pressure, as the fuel injection timing is advanced.

That is, in general, the fuel injection timing by the injector shifts towards the advanced side, and more particularly, the density of the gas in the combustion chamber rapidly changes with the ascending motion of the piston, with the lower density for the more advanced crank angle and the higher density for the more retarded crank angle. In other words, the penetration of the fuel spray is likely to increase as the fuel injection timing is advanced, and the penetration of the fuel spray is likely to decrease as the fuel injection timing is retarded.

In view of the above, in the present invention, when the fuel injection timing is advanced and thus the penetration of fuel spray is likely to increase, at least one of the controls is or are performed in which the valve opening duration of the injector is shortened and the fuel pressure is lowered.

This prevents unduly large penetration of the fuel spray, thereby avoiding the fuel deposition on the wall surface.

Additionally, it is preferable that the intake air temperature detecting device be provided for detecting the intake air temperature, and the injection control device performs at least one of the controls of shortening the valve opening duration of the injector for the higher temperature detected by the intake air temperature detecting devic, and lowering the fuel pressure for the higher temperature detected by the intake air temperature detecting device.

Accordingly, when the increase in intake air temperature decreases the density of the gas in the combustion chamber, the resulting increase in the penetration of the fuel spray can be cancelled by the shortening of the valve opening duration of the injector or the lowering of the fuel injection pressure.

Additionally, it is preferable that the intake air pressure detecting device be provided for detecting the intake air pressure, and the injection control device performs at least one of controls of shortening the valve opening duration of the injector for the higher pressure detected by the intake air pressure detecting device and lowering the fuel pressure for the higher pressure detected by the intake air pressure detecting device. Accordingly, when the decrease in intake air pressure decreases the density of the gas in the combustion chamber, the resulting increase in the penetration of the fuel spray can be cancelled by shortening the valve opening duration of the injector or lowering of the fuel injection pressure.

According to another aspect of the present invention, the fuel injection control device may control the injector to inject fuel during the intake stroke or during the compression stroke, so as to cause a first combustion configuration while the engine is in a region defined on the low load side, and to inject fuel at a timing near the top-dead-center of the compression stroke so as to cause a second combustion configuration where the ratio of the diffusion combustion is larger than that of the premixed combustion while the engine is in a region except for the region.

Accordingly, while the engine is in the middle load or high load region, the conventional diesel combustion is performed, which ensures a sufficient output. At the same time, this prevents a large amount of NOx production and unduly early ignition of the premixed mixture which are caused by the increased amount of injected fuel if the first combust configuration were otherwise performed during the middle load or high load region of the engine.

In the meantime, the diesel combustion requires a large amount of penetration so that the fuel can be injected into the combustion chamber under extremely high temperature near the top-dead-center of the compression stroke of the cylinder and the resulting fuel spray can adequately progress in highly dense air. Accordingly, the injector having a hole type nozzle is preferred.

According to yet another aspect of the present invention, in the case where the engine is equipped with a charging device for charging intake air, while the engine is on the higher load side of the predetermined operational region, the injection control device controls the injector to inject fuel in a divided manner with a plurality of shots, and performs at least one of controls in which the valve opening duration of the injector is more prolonged than the case where the same number of divisions for the divided injection under the operational condition on the lower load side, and the fuel injection pressure is greater than the case having the same number of divisions for the divided injection under the operational condition on the lower load side.

That is, the charging device charges air to significantly increase the density of the gas in the combustion chamber. Thus, even if the fuel is injected at an early timing, there is a small possibility of unduly large penetration of the fuel spray. Therefore, on the high load side, even in the predetermined operational region where the combustion configuration is dominated by the premixed combustion, even if the divided injection is performed, the respective valve opening durations are more prolonged or the fuel injection pressure is increased on the high load side which requires relatively high output and a large amount of fuel injection, than the case for the low load side. This reduces the number of division of the divided injection, so that the variation in the amount of injected fuel per one valve opening operation is decreased as a whole corresponding to the reduced number of the valve opening operation, thereby suppressing the variation in the amount of the injected fuel even with a large amount of fuel to be injected.

According to still another aspect of the present invention, there is provided a direct injection diesel engine which controls the injector to inject at least a part of fuel at an early timing (during the intake stroke or compression stroke) so as to attain the combustion state where the ratio of the premixed combustion is larger than that of the diffusion combustion, while the engine is in a predetermined operational region on the low load side, and performs conventional diesel combustion on the middle load or high load side for example, wherein the early time injection in the predetermined operational region is divided into a plurality of shots. Accordingly, the penetration of the fuel spray due to the early time injection is prevented from unduly increasing, even with an injector inherently capable of providing a large penetration.

According to these and other aspects of the present invention, there is provided a combustion control apparatus for a diesel engine comprising a fuel injector provided with a hole type nozzle and disposed so as to extend into a combustion chamber of a cylinder of the engine, and an injection control device for controlling the injector to inject fuel at least during the intake stroke and the compression stroke, so that a first combustion configuration, where the ratio of premixed combustion is larger than that of a diffusion combustion is performed, while the engine is in a region predetermined to be on the low load side, and to inject fuel at least at a timing near top-dead-center of the compression stroke, so that a second combustion configuration, where the ratio of diffusion combustion is larger than that of the premixed combustion, is performed, while the engine is in a region other than the predetermined region, wherein, the injection control device for controlling the injector injects fuel in a divided manner with a plurality of shots while the engine is in the predetermined region.

According to the constitution above, while the engine is in the predetermined operational region on the low load side, the injector which is provided so as to extend into the combustion chamber of the cylinder injects fuel at the early timing during the intake stroke or compression stroke of the cylinder, so that the first combustion state is attained where the ratio of the premixed combustion is larger than that of the diffusion combustion. This suppresses the NOx and soot production similar to the diesel engine disclosed in the proposed example (Japanese publication of Patent Application No. 9-158810).

On the other hand, while the engine is in the middle load region or in the high load region, the injector injects fuel at a timing near the top-dead-center of the compression stroke, so as to cause the second combustion state, for example, the conventional diesel combustion, where the ratio of the diffusion combustion is larger than that of the premixed combustion, thereby ensuring an adequate amount of output for the engine load.

In this case, the injector with the hole type nozzle provides a sufficient amount of penetration of the fuel spray to sufficiently extend the fuel spray travel even in the combustion chamber under extremely high pressure and high density near the top dead center of the compression stroke, thereby achieving the favorable diffusion combustion with a high air utilization ratio.

Additionally, according to this aspect, when the injector injects fuel at an early timing in the predetermined operational region, the fuel is injected in a divided manner with a plurality of shots. Thus, the respective valve opening durations for each of the injections is shortened to reduce the penetration of the fuel spray for the respective injection. Accordingly, fuel deposition on the wall surface is prevented, even in the case where the fuel is injected from a hole type nozzle which inherently provides the fuel spray which has high penetration, for the condition of low density of gas in the combustion chamber.

Other features, aspects, and advantages of the present invention will become apparent from the following description of the invention which refer to the accompanying drawings:

BRIEF DESCRIPTION OF THE DRAWINGS

FIGS. 13(*a*) and (*b*) are graphs showing examples of tables for correcting the allowable pulse width of the injector, using intake air temperature, and intake air pressure respectively.

FIGS. 17(a) and (b) are diagrams showing examples of tables for correcting the fuel pressure, using intake air temperature, and intake air pressure, respectively.

DETAILED DESCRIPTION OF THE PREFERRED EMBODIMENT

Figure 1:
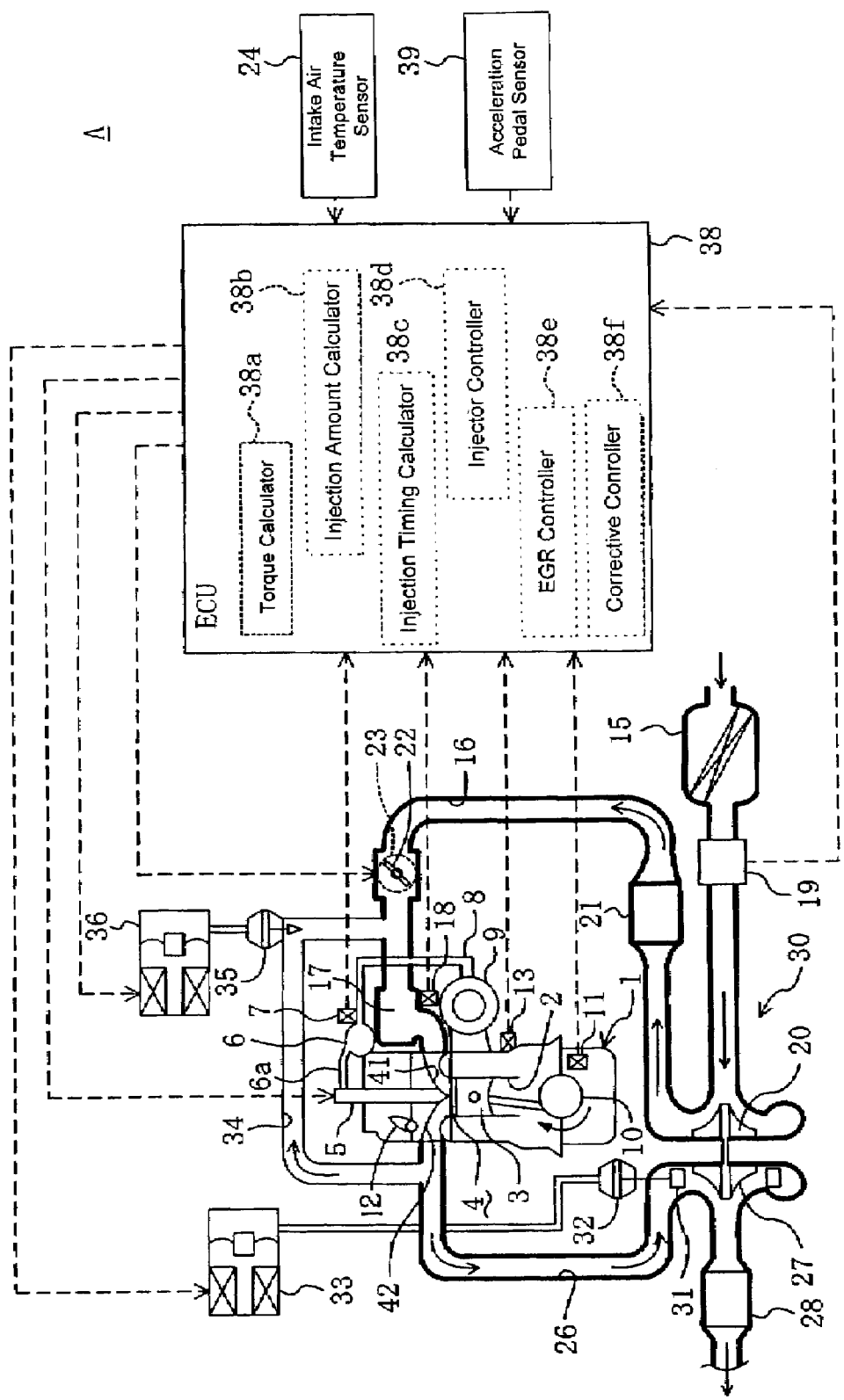
FIG. 1 is a schematic view of the engine combustion control apparatus in accordance with the preferred embodiments of the present invention.

FIG. 1 illustrates an overall configuration of a combustion control apparatus A for a diesel engine in accordance with a preferred embodiment of the present invention. Identified by reference numeral 1 is a diesel engine mounted in a vehicle. The engine 1 comprises a plurality of cylinders 2, only one of which is illustrated for convenience. A piston 3 is fitted within each cylinder 2 so as to reciprocate in the vertical direction, respectively. The piston 3 defines a combustion chamber 4 in each cylinder 2. At a roof portion of the combustion chamber 4, an injector (fuel injection valve) 5 is arranged. The tip of the injector 5 is unitarily provided with injection nozzles 50, from which high pressure fuel is directly injected into the combustion chamber 4.

Figure 2:
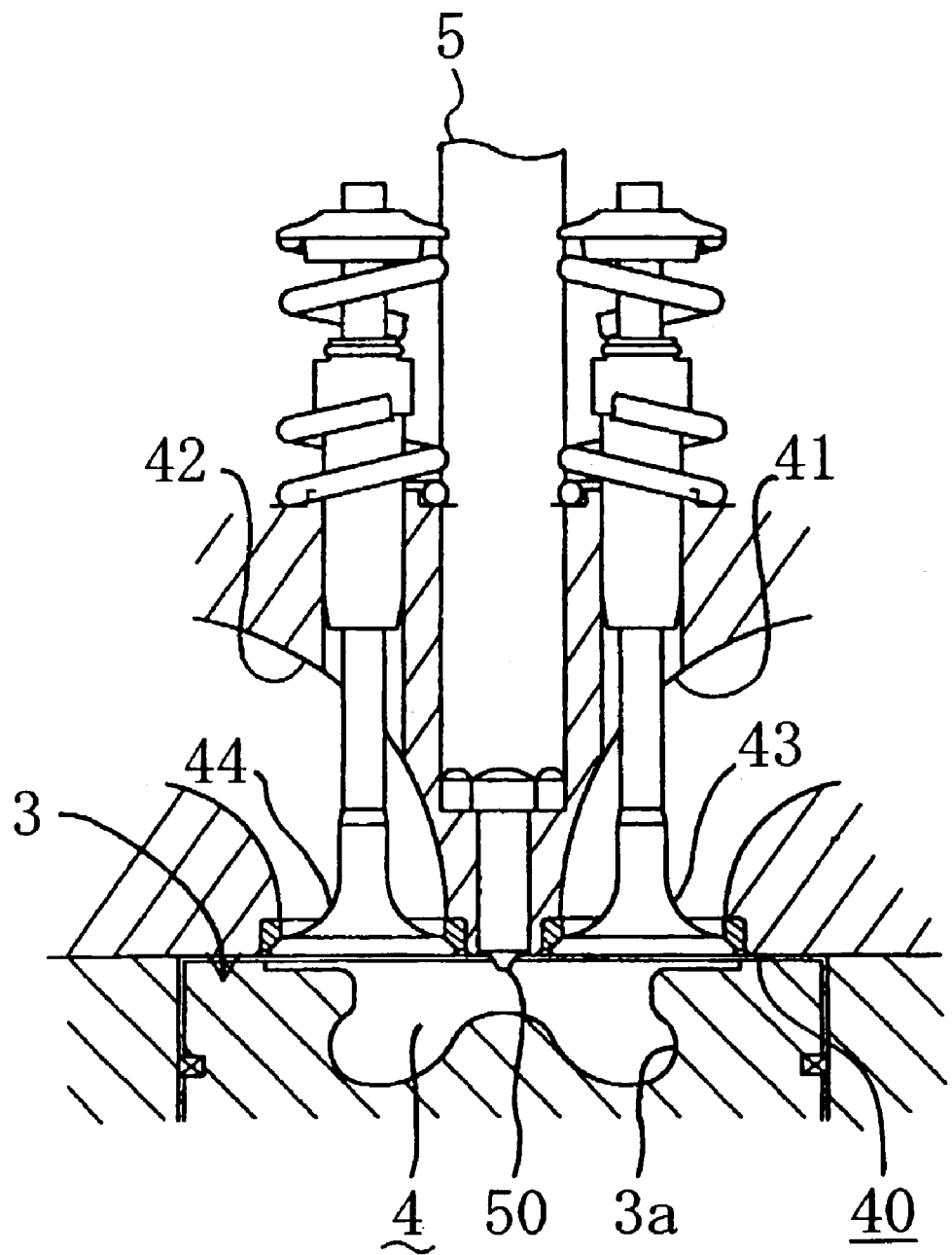
FIG. 2 is an enlarged cross-sectional view of the structure of the combustion chamber.

In detail, as shown in the enlarged view of FIG. 2, the roof 40 of the combustion chamber 4 is substantially flat.

At the substantially central portion of the roof 40 the injection nozzle 50 of the injector 5 extends into the combustion chamber by a fixed length. Surrounding the injection nozzle 50, four ports of intake ports 41,41 and exhaust ports 42, are formed. Each of the two intake ports 41, only one of which is illustrated, are upwardly curved in shape, and diagonally extends from the combustion chamber 4 to open on a side surface of the engine 1 (shown on the right side in FIG. 1). The two exhaust ports 42, only one of which is shown, merge into one halfway along the port and reach the other side surface of the engine 1 (on the left side in FIG. 1). At the opening edges of the respective ports 41, 42, which open to the combustion chamber, an intake valve 43 and an exhaust valve 44 are correspondingly disposed for opening and closing the ports.

Figure 3:
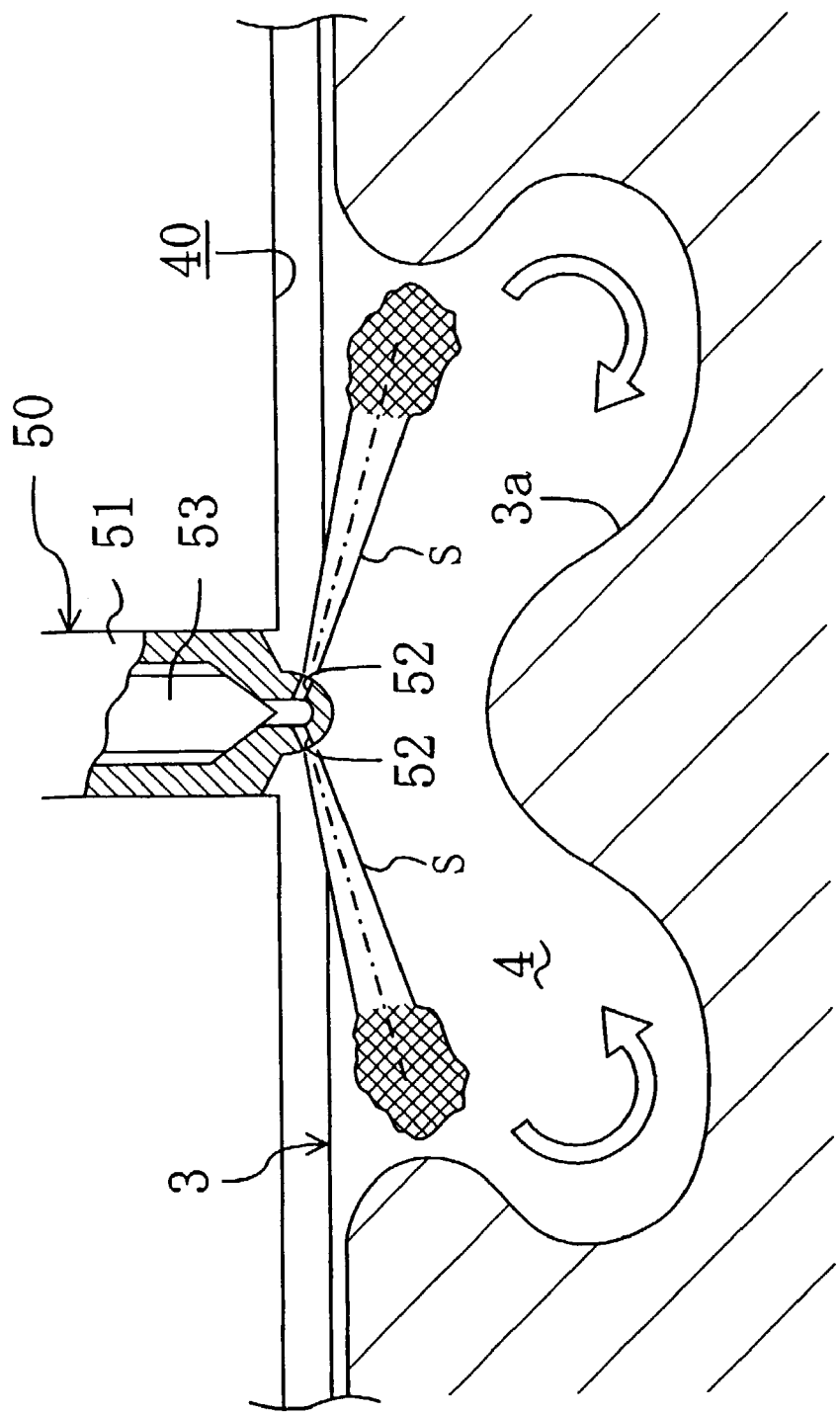
FIG. 3 is a schematic illustration of the fuel spray being injected by the injector when the cylinder stroke is near top-dead-center.

A cavity 3a is formed in a portion of the top surface of the piston 3 at a bottom of the combustion chamber 4. When fuel is injected from the injection nozzle 50 of the injector 5 near the top-dead-center of the cylinder 2, the fuel spray collides with an inner surface of the cavity 3a. That is, as schematically illustrated in FIG. 3, the injection nozzle 50 is of a multi-hole type, in which the injection nozzle 50 is formed with a projecting portion of a hemispherical shape at the tip of a nozzle body 51, and the projecting portion is formed with a plurality of (four to seven, for example) nozzle holes 52, spaced at regular intervals around the axis. Within the nozzle body 51, a needle valve 53 is disposed. The displacement of the needle valve 53 along its axial direction causes fuel to be injected through the respective nozzle holes 52.

In this manner, fuel sprays S are dispersed from the nozzle holes 52 of the injection nozzle 50. The fuel spray S has a large enough penetration so as to sufficiently develop even near the top-dead-center of the compression stroke at which the gas in the combustion chamber 5 is at extremely high pressure and high concentration. The fuel spray S dispersed from the nozzle hole 52 of the injector 5, as shown, reaches near the upper edge of the inner surfaces of the cavity 3a, and forms the mixture as indicated by cross hatching in the drawing, during the ignition delay time. When the mixture ignites, an expanding air-flow of combustion gas produces a tumble flow in the cavity 3a, as indicated by the outlined arrows. Then, the following fuel sprays are involved and successively combusted.

Referring again to FIG. 1, the injector 5 for each cylinder 2 is connected to a common fuel supply pipe 6 (a common rail) through delivery pipes 6a, only one of which is illustrated in the drawings for simplification.

The common rail 6, which is connected to a high-pressure supply pump 9 through a fuel supply pipe 8, accumulates fuel supplied from the high-pressure supply pump 9 at high pressure in order to supply fuel to injectors 5 at given timings. A fuel pressure sensor 7 is disposed in the common rail 6 for detecting inside fuel pressure (common rail pressure).

The high-pressure pump 9 is connected to a fuel supply system not shown and is operably connected to a crank shaft 10 through a toothed belt or other parts, for pressure-feeding the high-pressure fuel to the common rail 6.

The fuel is partially returned to the fuel supply system via a solenoid valve to adjust the amount of the fuel to be supplied to the common rail 6.

The opening of the solenoid valve is controlled by an ECU 38, which will be described further herein, based on the detected value of the fuel-pressure sensor 7, so that the fuel pressure is set to a predetermined value corresponding to the operating condition of the engine 1.

Additionally, the engine 1 is provided with a crank angle sensor 11 for detecting a rotational angle of the crank shaft 10; a camshaft angle sensor (not shown) for detecting a rotational angle of a valve-driving camshaft 12; and an engine coolant temperature sensor 13 for detecting temperature of coolant.

The crank angle sensor 11, not illustrated in detail, comprises a detectable plate provided at the end of,the crankshaft and an electromagnetic pickup facing the periphery of the plate. The pickup generates pulsed signals in response to the approach of teeth formed at regular intervals on the outer peripheral surface of the detectable plate.

One side surface of the engine 1 (shown as the right-side surface in FIG. 1) is, connected to an intake passage 16 for supplying intake air (fresh air) filtered by an air cleaner 15 to the combustion chamber 4. At the downstream end of the intake passage 16, a surge tank 17 is disposed, from which respective passages branch out to communicate with the combustion chamber 4 in each cylinder 2 via intake ports. The surge tank 17 is provided with an intake air pressure sensor 18 (as means for detecting an intake air pressure) for detecting the pressure of intake air.

In the intake passage 16, from the upstream side to the downstream side, the following components are provided in order: a hot-film type air flow sensor 19 for detecting the amount of intake air introduced from the outside into the engine 1; a blower 20 driven by a turbine 27 (which will be described herein) for compressing intake air; an intercooler 21 for cooling intake air compressed by the blower 20; and an intake-air throttle valve 22 comprising a butterfly valve. A valve shaft of the throttle valve 22 is rotated by a stepping motor 23, so that the valve can be set to a predetermined position between a fully closed state and a fully open state. In the fully closed state of the valve 22, a clearance is left between the throttle valve 22 and an inner wall of the intake passage 16, through which air passes. The intake air temperature sensor 24 (as means for detecting intake air temperature) is disposed in the intake passage 16 between the intercooler 21 and the surge tank 17, for detecting intake air temperature.

Meanwhile, the opposite side of the engine 1 (the left-side surface in FIG. 1) is connected to an exhaust passage 26 for exhausting combusted gas (exhaust gas) from the combustion chamber 4 in each cylinder 2.

The upstream end of the exhaust passage 26 branches out corresponding to the respective cylinders 2, to form exhaust manifolds in communication with the combustion chamber 4 via exhaust ports. In the exhaust passage 26 downstream of the exhaust manifold, from the upstream side to the downstream side, the following components are provided in order: a turbine 27 rotated by an exhaust flow; and a catalyst converter 28 capable of purifying harmful components (for instance, unburned HC, CO, NOx, carbon) in the exhaust gas.

A turbocharger 30 comprising the turbine 27 and a blower 20 in the intake passage 16 is of a variable geometry turbocharger (referred to as VGT, hereinafter), which adjusts a cross-sectional area (nozzle cross-sectional area) in the exhaust passage communicating with the turbine 27 using adjustable flaps 31. Each of the flaps 31 are operably coupled to a diaphragm 32 via link mechanisms not shown. The negative pressure acting on the diaphragm 32 is adjusted by a solenoid valve 33 for controlling the negative pressure, so that the rotational positions of the flaps 31 are adjusted to change the nozzle cross-sectional area. It should be appreciated that the turbocharger is not limited to a variable geometry turbocharger.

An upstream end of a exhaust gas recirculation passage 34 (herein referred to as the EGR passage), for recirculating part of the exhaust gas to the intake air, is connected to the exhaust passage 26 on the upstream side of the turbine 27 with respect to the exhaust-gas flow. The downstream end of the EGR passage 34 is connected to the intake passage 16 between the throttle valve 22 and the surge tank 17 so that part of the exhaust gas flowing out from the exhaust passage 26 is recirculated into the intake passage 16. Near the downstream end of the EGR passage 34, an exhaust recirculation amount regulator valve 35 (herein referred to as the EGR valve) is disposed, which can be controlled to change its opening. The EGR valve 35 is of a vacuum sensing type. Similar to the flaps 31 of the VGT 30, the negative pressure acting on a diaphragm is adjusted by a solenoid valve 36, so that a cross-sectional area of the EGR passage 34 is linearly controlled to adjust the amount of exhaust-gas flow recirculated to the intake passage 16.

The injector 5, the high-pressure pump 9, the throttle valve 22, the VGT 30, the EGR valve 35, and the other parts, operate according to control signals transmitted from a control unit 38 (Electronic Control Unit: referred to as ECU hereinafter). On the other hand, the ECU 38 receives output signals from the fuel pressure sensor 7, the crank angle sensor 11, the camshaft angle sensor, the coolant temperature sensor 13, intake air pressure sensor 18, the air flow sensor 19, the intake air temperature sensor 24, and other parts. The ECU 38 further receives an output signal from an acceleration pedal sensor 39 for detecting an accelerator pedal travel operated by a driver (accelerator pedal position).

The ECU 38 basically controls the engine 1 in such a way as to determine a basic target fuel injection amount mainly according to the accelerator pedal position; adjust the fuel injection amount and an injection timing by controlling the operation of the injector 5; and adjust the fuel pressure, or the injection pressure of fuel by controlling the operation of the high-pressure pump.

Moreover, the ECU 38 controls the throttle valve 22 and the EGR valve 35 to adjust the ratio of the returning exhaust gas into the combustion chamber 4, and controls the flaps 31 of the VGT 30 (the control for the VGT) to improve charging efficiency of intake air.

Figure 4:
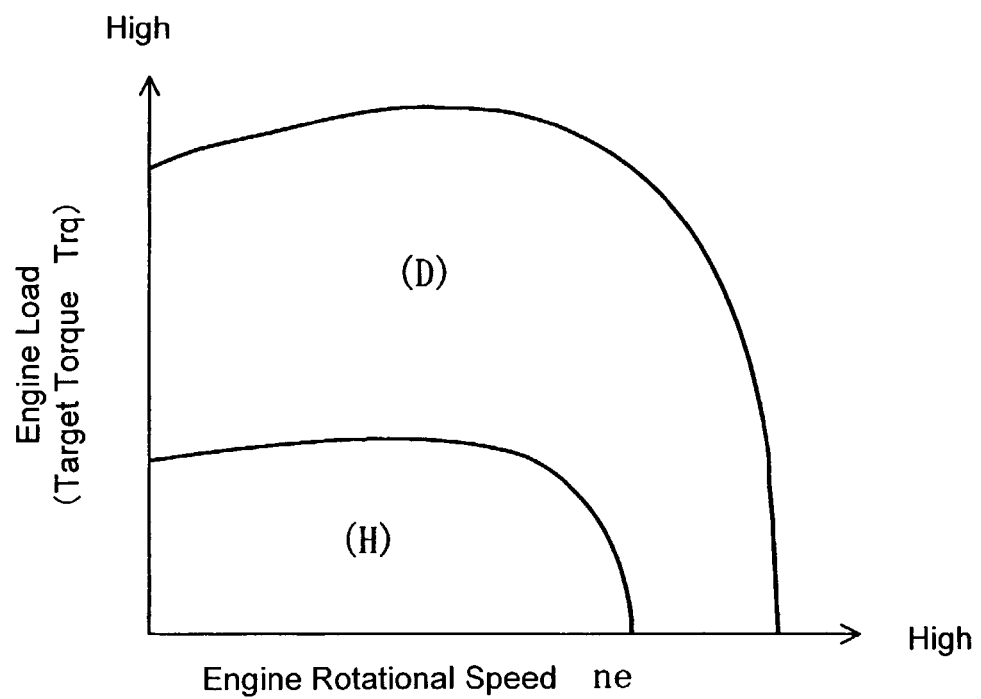
FIG. 4 is a graph of a map used for switching the engine combustion modes.
Figure 5:
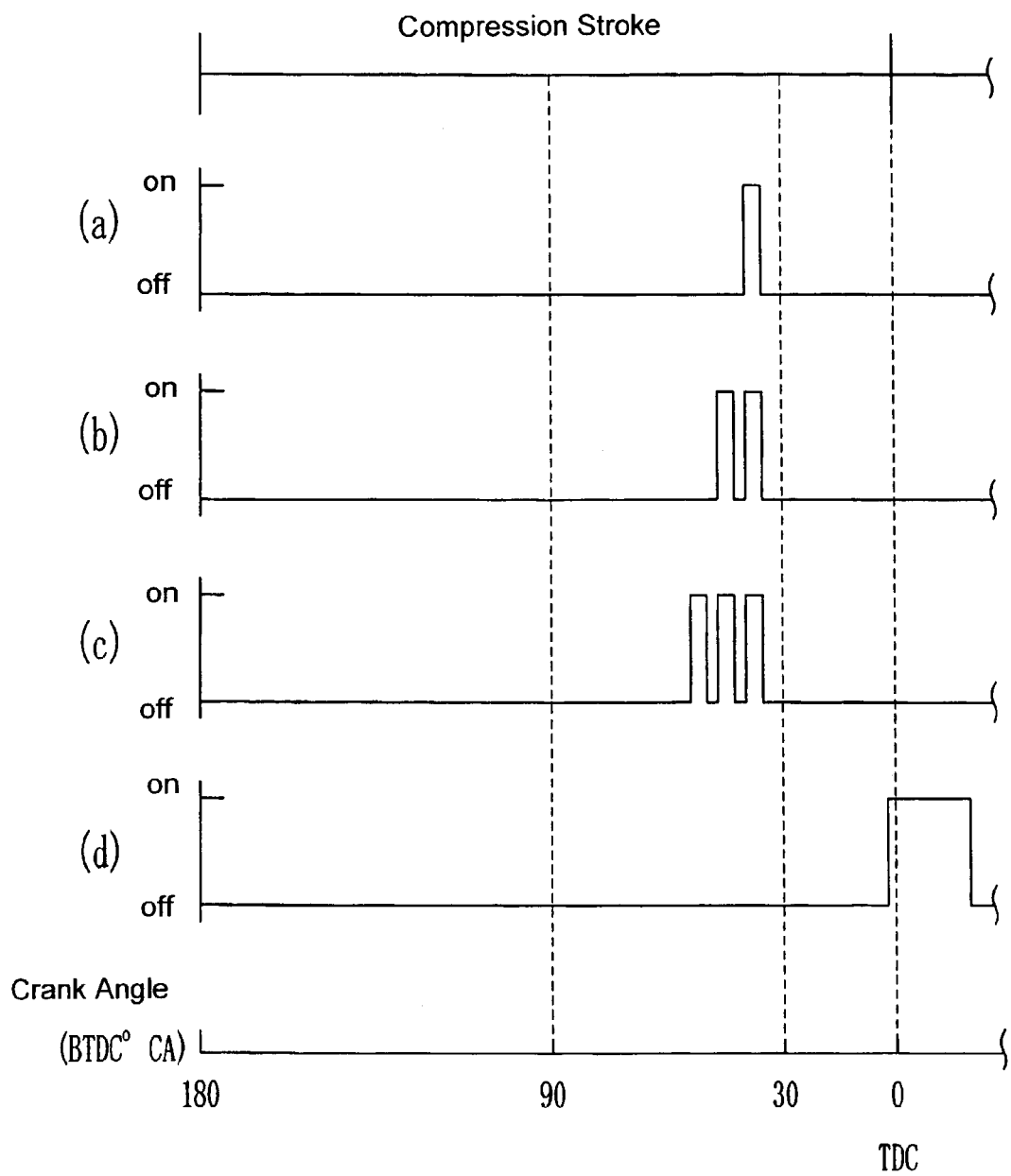
FIGS. 5(*a*), (*b*), (*c*), and (*d*) are graphs illustrating the fuel injection operation of the injector.

Particularly, as shown in the control map (combustion mode map) of FIG. 4, for example, a region of a premixed combustion (H) is defined on the low engine load side in the whole operational region in a warmed-up state of the engine 1. In the region, as shown in FIGS. 5($a$) to ($c$), the injector 5 injects fuel within a period between the middle-stage and the late-stage of the compression stroke to cause a self-combustion of the mixture, after the mixture previously becomes as homogeneous as possible.

This combustion configuration is commonly referred to as the premixed compressive ignition combustion. Under the combustion configuration, most of the mixture simultaneous ignites after the elapse of an ignition delay time and combusts at once, by properly adjusting the fuel injection timing to broadly diffuse the fuel adequately for attaining a mixture well-mixed with air, when the smaller amount of the fuel is to be injected per one cycle of the cylinder. That is, the premixed compressive ignition combustion is defined as the combustion state where the ratio of premixed combustion is larger than that of diffusion combustion (first combustion state).

During the premixed compressive ignition combustion, the EGR valve 35 is opened to return exhaust gas into the intake passage 16. Accordingly, the inactive exhaust gas is mixed with fresh air supplied from the outside, and the resulting gas is mixed with fuel droplets and fuel vapor. This mixture containing the exhaust gas (carbon dioxide and other gas) prolongs the ignition delay time of fuel, which suppresses unduly early ignition prior to the top-dead-center of the compression stroke and lowers the combustion temperature during the simultaneous combustion of premixed mixture, thereby decreasing NOx production.

Specifically, while the engine 1 is operating in the premixed combustion region (H), the EGR valve 35 is opened relatively wide to return a considerable amount of exhaust gas through the EGR passage 34. At the same time, the opening of the EGR valve 35 is controlled based on the operational condition of the engine 1 to adjust an EGR ratio (the ratio of the amount of recirculation gas to that of the flesh air in intake air). As a result, the ignition delay time of fuel is adjusted, thereby providing a proper timing of the self-ignition. This achieves a heat generation characteristic of high heat efficiency, with improved fuel efficiency.

Figure 6:
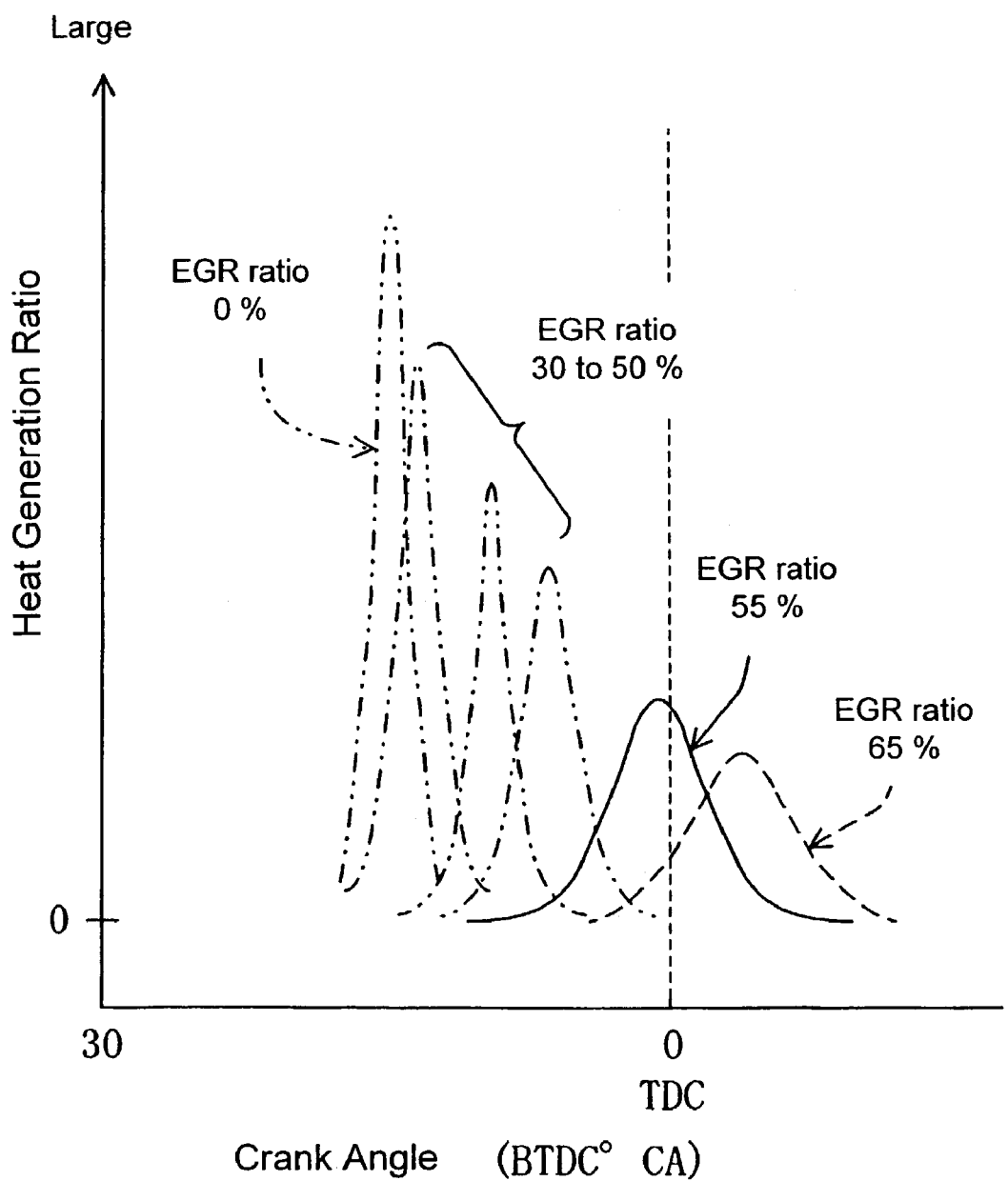
FIG. 6 is a graph illustrating the change in heat generation ratio with respect to the EGR ratio.

FIG. 6 is an empirical graph showing a change in the heat generation characteristic with respect to the EGR ratio, when the injection is performed at a predetermined crank angle prior to the top-dead-center of the compression stroke, for instance BTDC 30 degree CA., to cause the premixed compressive ignition combustion while the engine 1 is in a low load condition. FIG. 6 reveals, as indicated by phantom lines in the drawing, that a small EGR ratio causes the premixed mixture to self-ignite on the significantly advanced side of the top-dead-center (TDC), which provides unduly early heat generation with low cycle-efficiency. In addition, the timing of the self-ignition gradually shifts towards the advanced side as the EGR ratio increases, and as indicated by solid lines in the drawing, the EGR ratio of 55% maximizes the heat generation at TDC, which provides heat generation with maximum heat efficiency. That is, under this empirical condition, the cycle efficiency inevitably decreases to reduce fuel efficiency, with the EGR ratio whether lower or higher than 55%.

As described above with the optimum EGR ratio providing high cycle efficiency, the recirculation of a considerable amount of exhaust gas decreases the amount of supplied flesh air, as a result, an excess oxygen ratio $\lambda$ is approximated to one (the state of approximately stoichiometric in air-fuel ratio). However, because the mixture includes a considerable amount of inactive exhaust gas, the fuel concentration and oxygen concentration are not so large, even with their ratio providing $\lambda=1$. Thus, it is believed that an abrupt increase in combustion temperature is avoided even if the mixture simultaneously combusts, thereby producing little amount of NOx.

Figure 7:
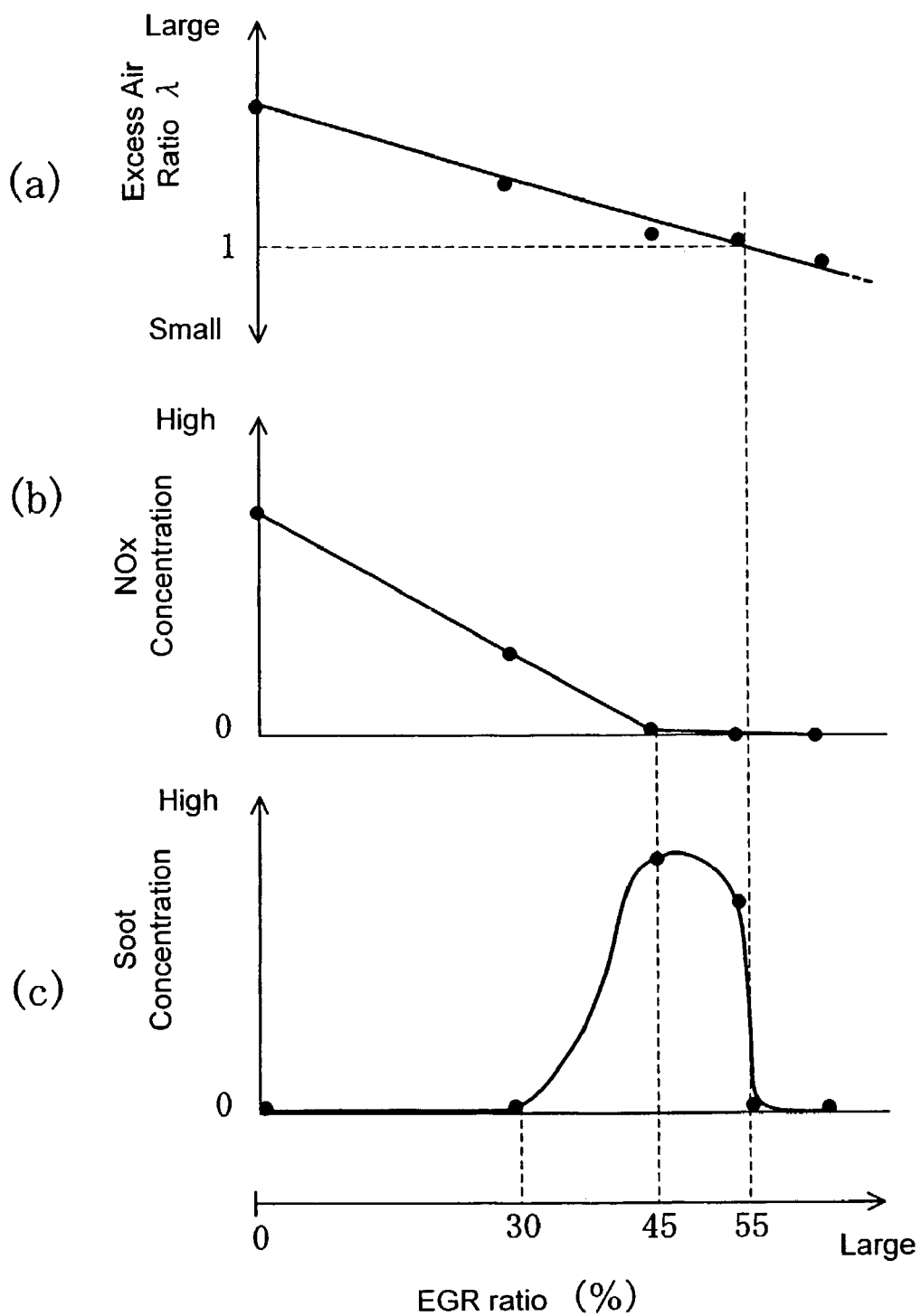
FIGS. 7(*a*), (*b*), and (*c*) are graphs relationally showing the changes in excess air ratio, NOx concentration, and soot concentration respectively.

FIG. 7 shows changes in an excess air ratio $\lambda$ in the combustion chamber 4 and concentrations of NOx and soot in the exhaust gas with respect to the EGR ratio in FIG. 6. FIG. 7(a) reveals that, under this empirical condition, the large excess air ratio $\lambda$ of approximately 2.7 is attained when the EGR ratio is 0%, and the increase in EGR ratio gradually decreases the excess air ratio $\lambda$, until eventually providing $\lambda=1$ when the EGR ratio is approximately 55% to 60%. Additionally, FIG. 7(b) reveals that the increase in EGR ratio decreases the NOx concentration in exhaust gas at a constant rate, until NOx is hardly generated with the EGR ratio greater than 45%.

As for soot production, FIG. 7(c) reveals that soot is hardly generated with the EGR ratio between 0 and approximately 30%. Then, soot concentration abruptly increases when the EGR ratio exceeds approximately 30%, but decreases again when the EGR ratio exceeds approximately 50%, until reaching approximately zero when the EGR ratio exceeds approximately 55%. The relationship between EGR and soot is attributed in that the small EGR ratio preferably causes the conventional diesel combustion (the combustion in which the ratio of the diffusion combustion is larger than that of the premixed combustion) to hardly produce soot, and then the increased EGR ratio deteriorates the diesel combustion to produce the more amount of soot; and the EGR ratio equal to or larger than approximately 55% with considerable amount of EGR gas (exhaust gas) significantly prolongs the ignition delay time, during which the fresh air and the mixture are sufficiently mixed with each other to form substantially homogeneous mixture, which produces no soot when the combustion of the mixture (premixed combustion) occurs.

In contrast to the premixed compressive ignition combustion as describe above, in the operating condition (D) except for the region (H), the conventional diesel combustion is caused in which the ratio of the diffusion combustion is larger than that of the premixed combustion, as shown in the control map of FIG. 4. Specifically, as shown in FIG. 5(d), the injector 5 injects fuel at a timing near the top-dead-center (TDC) of the compression stroke so that the diffusion combustion of most mixture occurs following initial premixed combustion. The operational region (D) is herein referred to as the diffusion combustion region. In this operational region, the injection may be executed at other timings, than the timing near top-dead-center of the compression in cylinder 2. This achieves a combustion configuration dominated by the diffusion combustion, thereby providing a high engine torque output.

Moreover, the EGR valve 35 is opened to recirculate the exhaust gas on the low engine load side even in the diffusion combustion region (D). At this time, the opening of the EGR valve 35 may be controlled so to be smaller than that in the premixed combustion region (H), and the EGR ratio may be controlled to decrease as the load of the engine 1 increases in order to ensure the supply of the fresh air to the cylinder 2. As a result, the exhaust gas is not substantially recirculated on the higher engine load side in the diffusion combustion region (D).

The transition of the combustion configuration as described above is achieved by the controls of the injector 5 and the opening of the EGR valve 35 according to the load and the rotational speed of the engine 1. Both controls are performed based on the execution of the prescribed control program by the ECU 38. Referring again to FIG. 1, the ECU 38 includes a torque calculator 38a for calculating a target torque of the engine 1 according to the accelerator pedal position and engine rotational speed; an injection amount calculator 3 8b and an injection timing calculator 38c for calculating the amount and timing of fuel injection respectively, mainly according to the target torque and the engine rotational speed; and an injector controller 38d for controlling the injector 5 based on the calculations of the calculators.

Further, the ECU 38 includes an EGR controller 38e (exhaust gas recirculating means) which adjusts the opening of the EGR valve 35 to attain a predetermined EGR ratio according to the operational condition of the engine 1 and regulate the recirculation of the exhaust gas through the EGR passage 34.

Figure 8:
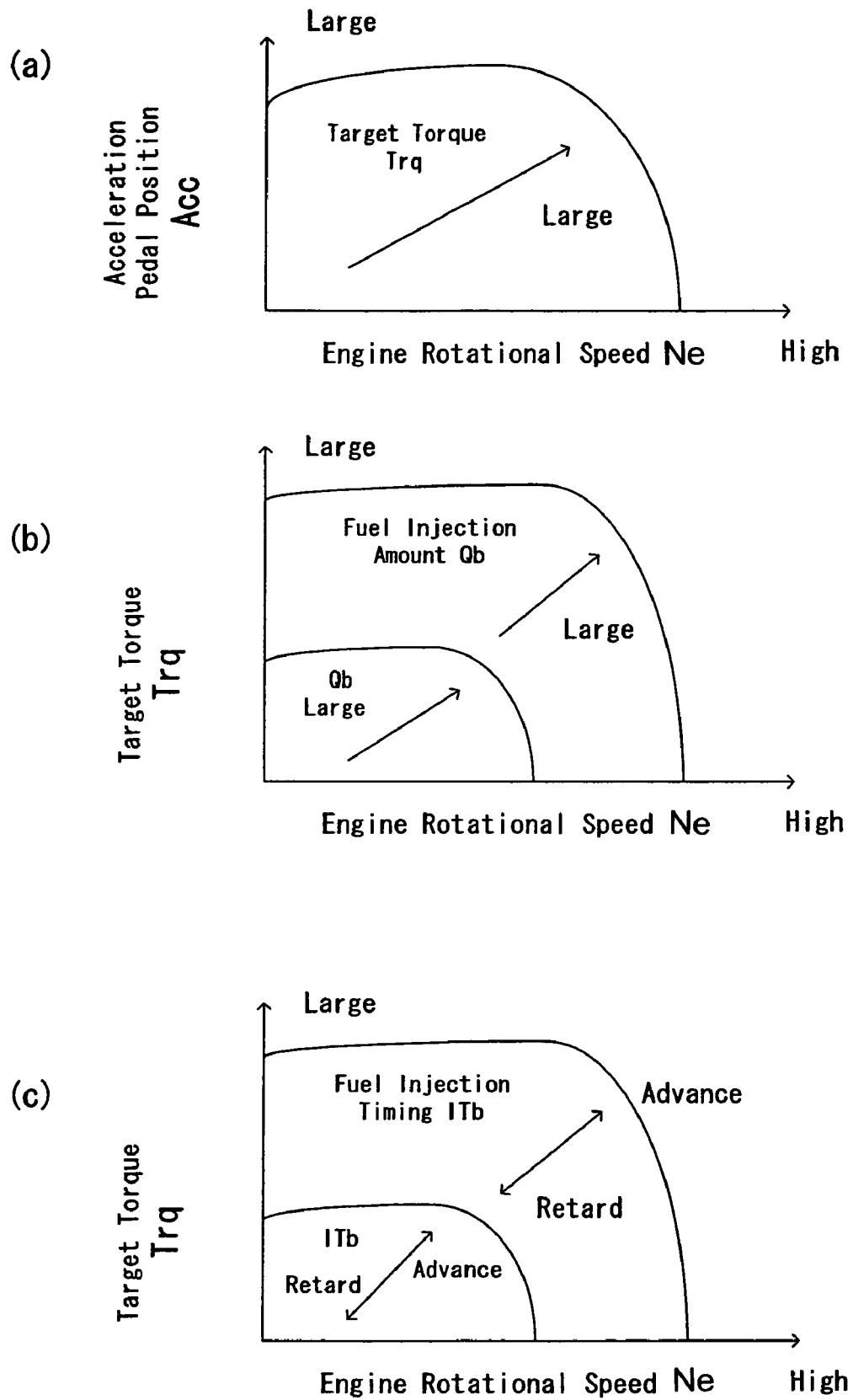
FIGS. 8(*a*), (*b*), and (*c*) are graphs illustrating examples of a target torque map, an injection amount map, and an injection timing map respectively.

The torque calculator 38b calculates a target torque in the following manner by way of example:

According to the accelerator pedal position Ace detected by the acceleration pedal sensor 39 and the engine rotational speed Ne determined from the output signal of the crank angle sensor 11, the torque calculator 38a calculates the target torque Trq corresponding to the required output of the engine 1 with reference to a control map (target torque control map: refer to FIG. 8(a)) which has been empirically prescribed in advance. The injection amount calculator 38b reads a basic amount of fuel injection Qb from a control map (fuel injection amount map: refer to FIG. 8(b)) which has been empirically prescribed in advance, according to the target torque Trq and the engine rotational speed Ne. The illustrated map in the drawing provides the larger amount of the basic fuel injection Qb for the larger accelerator pedal position Acc and for the higher engine rotational speed Ne, in both the premixed combustion region (H) and the diffusion combustion region (D).

The injection timing calculator 38c calculates a basic injection timing ITb (a crank angle at which the needle valve of the injector 5 opens) with reference to a control map (injection timing map: refer to FIG. 8(c)) which has been empirically prescribed in advance, according to the accelerator pedal position Acc and the engine rotational speed Ne. The basic injection timing ITb, in the diffusion combustion region (D), is set in association with the fuel injection amount and the fuel pressure (the pressure in the common rail) so that the completion of fuel injection (a crank angle at which the needle valve of the fuel injector 5 closes) is at a predetermined timing after the top-dead-center of the compression stroke and the fuel spray preferably diffuses. In the premixed combustion region (H), the basic injection timing ITb is set within a predetermined crank angle range during the compression stroke of the cylinder 2 in association with the amount of fuel injection and the fuel pressure, so that most fuel spray combusts after sufficiently mixing with air.

Specifically, the basic injection timing ITb is set so as to be advanced for the larger accelerator pedal position Acc and for the higher engine rotational speed in both the premixed combustion region (H) and the diffusion combustion region (D). In the premixed combustion region (H), the basic injection timing ITb is advanced more than that in the diffusion combustion region (D). For example, the timing ITb in the premixed combustion region is set within a range between 180 degree, that is the bottom-dead-center of the compression stroke, and 30 degree CA (a predetermined crank angle range). This crank angle range is properly set so that the fuel spray sufficiently mixes with air to form substantially homogeneous mixture and the mixture is not unduly dilute during the range. Preferably, the crank angle range may be set from BTDC 90 to 30 degree CA while the amount of fuel injection is relatively small. This is because the injection of a small quantity of fuel at unduly early timing may possibly cause the degradation in ignitability due to the excessively dilute mixture, and, when the injection timing is set at the timing after BTDC 30 degree CA, the fuel spray and air tend to insufficiently mix with each other and the retarded injection timing enhances the ratio of the diffusion combustion of the mixture, which is likely to produce soot.

Figure 9:
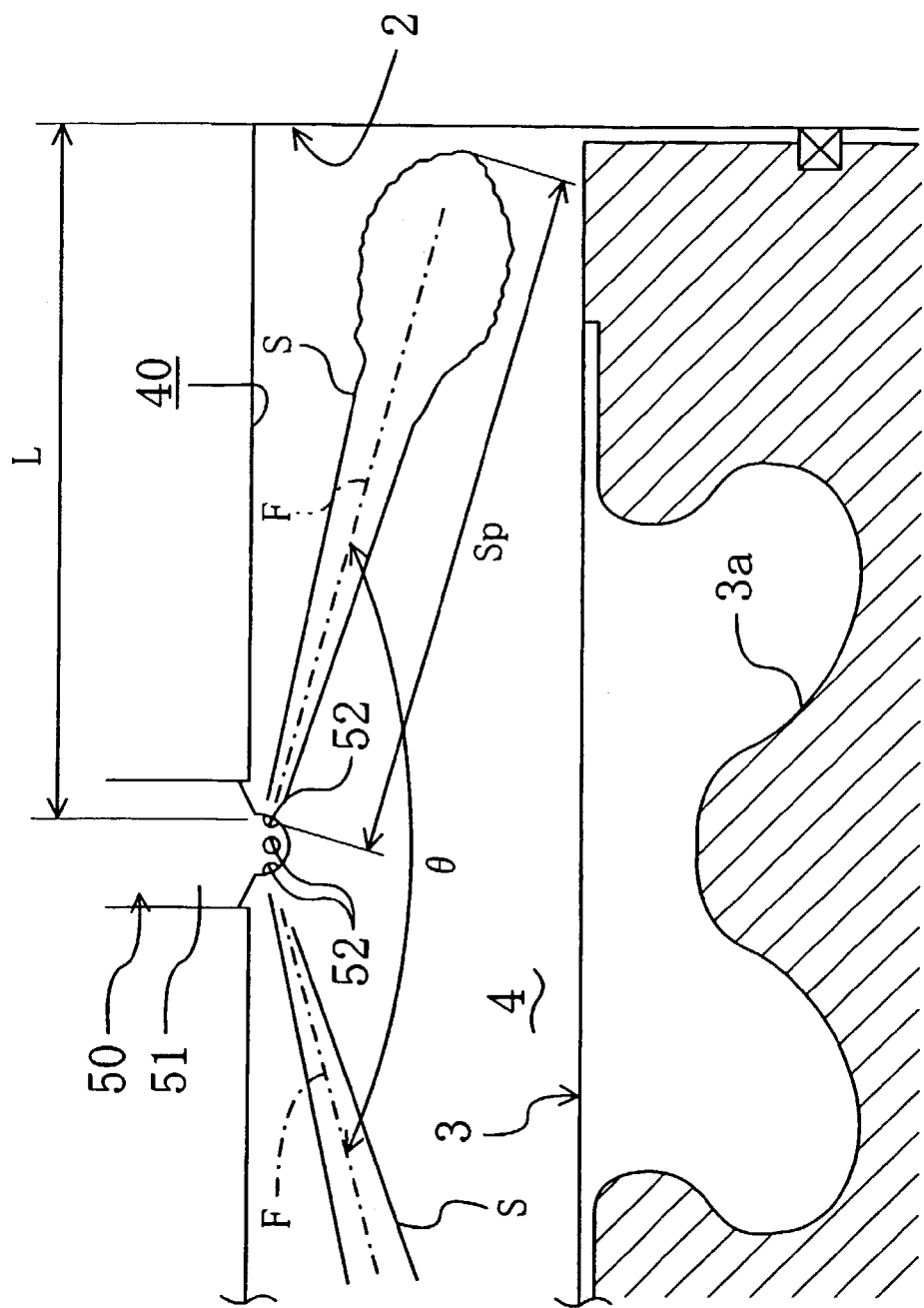
FIG. 9 is a schematic diagram corresponding to FIG. 3, illustrating fuel injection at the middle stage of the compression stroke.

In the meantime, as described above, if the injector 5 is controlled to inject fuel at an early timing, while the engine 1 is operating in the premixed combustion region (H), the fuel penetration may increase causing the fuel in droplets to deposit on the inner surface of the cylinder 2, because the piston 3 is distant from the position at the top-dead-center and the density and pressure of the gas in the combustion chamber 4 is relatively low, as schematically shown in FIG. 9. As a result, the fuel efficiency is degraded because of the fuel deposition, the unburned HC concentration becomes high in exhaust gas, and the deposited fuel on the surface may possibly cause soot generation.

In this regard, particularly, the fuel penetration of the fuel spray Sp is generally expressed by the fuel-spray travel based on the Hiroyashu formula as follows:

$$Sp = Spb + 2.95 \times (\Delta P \times 10^6/\rho f)^{0.25} \times (Dn \times (t-tb))^{0.5}$$

$$Spb = 0.39 \times (2 \times \Delta P \times 10^6/\rho f)^{0.5} \times tb$$

$$tb = 28.65 \times (\rho f \times Dn \times 10^{-3})/(\rho A \times \Delta P \times 10^6)^{0.5}/10^{-3}$$

Where $\Delta P$ (MPa) is the pressure difference between surrounding pressure and injection pressure; $\rho f$ (kg/m³) is the density of diesel fuel; Dn is the diameter of the injection bore (mm); t is the elapsed time after the start of fuel injection (for example 0.42 ms); and $\rho A$ is the density of surrounding gas.

The formula shows that the penetration of the fuel spray Sp rises with an increase in the pressure difference $\Delta P$ between the surrounding pressure and the injection pressure, and is inversely proportional to the square root of density of surrounding gas $\rho A$. In addition, it is well known that the fuel spray grows during a period when the injection 5 keeps opening its valves and fuel is continuously injected from the injection bore, and stops growing once the injection bores close. In other words, the penetration of the fuel spray becomes larger for the longer period during which the injector 5 keeps opening its valves (valve opening duration), i.e. for the larger width of the pulse signal entered into the injector 5 (pulse width).

In accordance with the facts described above, the engine 1 of the preferred embodiment features that at least one of the valve opening duration and the injection pressure (that is, the fuel pressure) is or are controlled according to the pressure and density of the gas in the combustion chamber 4 so as to prevent penetration of the fuel spray from unduly growing for avoiding the deposition on the inner wall of the cylinder 2 of the fuel injected by the injector 5 at an early timing. However, the unduly small penetration of the fuel spray precludes the fuel from sufficiently diffusing over the combustion chamber 4.

Thus, for instance, it is the most preferable that the fuel-spray travel (the fuel. penetration Sp) of the fuel injected during the valve opening duration of the injector 5 should be a value within a range determined based on a dimension in the radial direction of the cylinder 2.

Accordingly, with the injector 5 which arranges hole-type injection nozzle 50 approximately at the central portion of the cylinder 2, the fuel-spray travel is preferably set to a sufficiently large value within such a predetermined range that prevents the fuel spray S from reaching the inner surface of the cylinder, in consideration with the distance L between the respective injection holes 52, of the injection nozzle 50 and the inner wall of cylinder 2 (the dimension in the radial direction of the cylinder 2), and a traveling direction of the fuel spray (the central axis of the fuel spray F), as shown in FIG. 9. Specifically, for the example shown in the drawing, a relationship should be fulfilled, which is geometrically expressed as the following formula:

$$\alpha \times L = <Sp \times \cos((180-\theta)/2)<L$$

where $\theta$ is a corn angle of the multi-hole type injection nozzle 50; and $\alpha$ is a constant smaller than one (for example between 0.85 and 0.95).

This prevents the fuel from depositing on the wall surface while diffusing the fuel over the combustion chamber 4 to improve the homogeneity in the mixture.

More particularly, the injector 5 is controlled to inject fuel in a one-shot manner as shown in FIG. 5(a), when the engine is operating in the extreme low load region with the amount of fuel injection calculated by the fuel injection amount calculator 38b being a predetermined value or less, and the injector 5 injects fuel in a divided manner with a plurality of shots when the engine 1 is operating in the region, except for the region as shown in FIGS. 5(b) and (c), in the case that the engine 1 is in the premixed compressive ignition combustion region (H). Thus, in the premixed combustion region (H) except for the extreme low engine load region, the injector 5 performs divided injection with a plurality of shots, so that the valve opening duration of the injector 5 for respective division is shortened even with a relatively large amount of the fuel to be injected per a cycle of the cylinder 2. This sufficiently reduces the penetration of the fuel spray for the respective injections, thereby preventing the fuel from depositing on the inner surface of the cylinder 2.

As for the number of the divisions, for instance, the premixed combustion region may be equally divided into two regions with respect to the engine load, and then, in the lower load region, the fuel may be injected in the one-shot manner as shown in FIG. 5(a), on the other hand, in the higher load region, the fuel may be injected in the two-divided manner with the fuel equally divided in two as shown in FIG. 5(b). Alternatively, the premixed combustion region may be equally divided into three regions with respect to the engine load. In the lowest load region, the fuel may be injected in the one-shot manner as shown in FIG. 5(a). In the middle load region, the fuel may be injected in the two-divided manner as shown in FIG. 5(b). In the highest load region, the fuel may be injected in the three-divided manner as shown in FIG. 5(c). Further, the injection may be divided into four or more.

However, because the amount of respective fuel in each injection by the injector 5 includes variation, the increase in the number of division causes the integrated variation to increase correspondingly to the increased number of divisions. Therefore, the number of divisions is preferably set smaller, with the valve opening duration of the injector 5, described herein, being kept within an allowable range.

With regard to the valve opening duration of the injector 5, the valve opening duration corresponds to the travel of the fuel spray S injected by the injector 5 (penetration Sp), thus the optimum duration depends on at least the density ρ A of the gas in the combustion chamber 4. Specifically, the pressure and density of the gas in the combustion chamber 4 abruptly rises as the piston 5 ascends during the compression stroke of the cylinder 2. Accordingly, the penetration of he fuel spray tends to increase for the more advanced injection timing of the injector 5, and the penetration tends to decrease for the more retarded injection timing. In view of the above, it is preferable that the valve opening duration of the injector 5 should be shortened as the starting timing of the fuel injection is advanced, and the duration should be prolonged as the starting timing is retarded.

Figure 10:
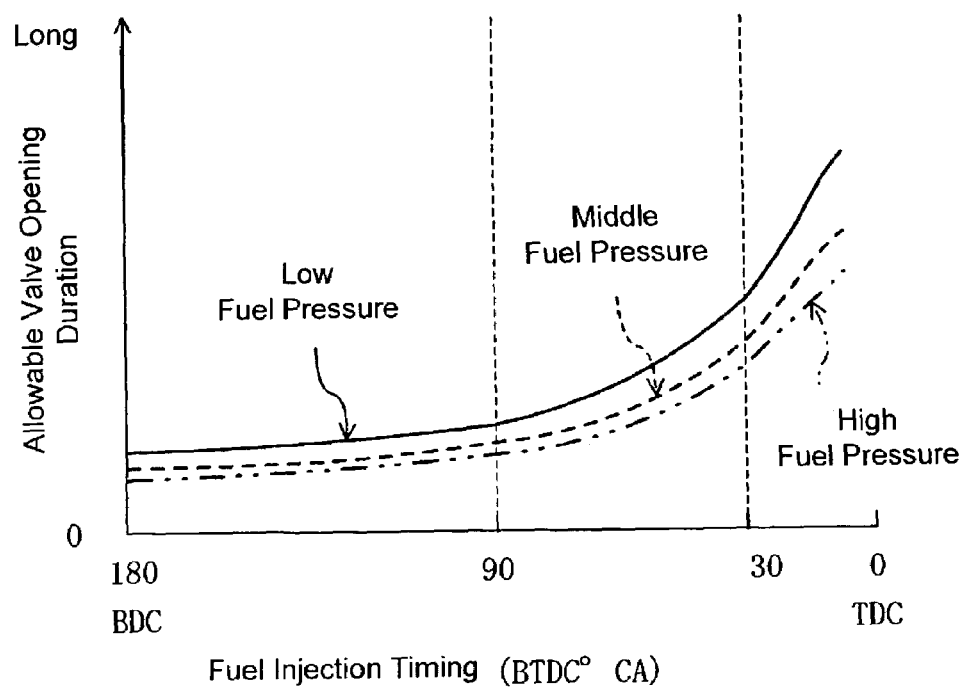
FIG. 10 is a graph illustrating the change in the valve opening duration of the injector during the compression stroke with respect to the fuel injection timing.

The graph chart shown in FIG. 10 illustrates the change in the maximum valve opening duration of the injector 5 during the compression stroke of the cylinder 2 (herein referred to as the allowable valve opening duration) with respect to the injection timing during the compression stroke in the cylinder 2. The graph chart reveals that the allowable valve opening duration of the injector 5, capable of avoiding the fuel deposition on the inner wall, is prolonged as the injection timing of the injector 5 (the starting timing of the injection) is retarded.

Especially, the duration is abruptly prolonged as the injection timing is retarded, on the retard side of BTDC 90 degree CA.

Moreover, the graph of FIG. 10 shows that the allowable valve opening duration depends on the fuel pressure such that the duration is prolonged as the fuel pressure decreases.

Thus, the fuel pressure may be lowered as the starting timing of the fuel injection by the injector 5 is advanced.

However, according to the graph, the influence of the fuel pressure on the allowable valve opening duration of the injector 5 is smaller than the influence of the injection timing on the duration. Additionally, in consideration for the response in the fuel pressure control, the valve opening duration for one injection is more preferably controlled by correcting the pulse width entered into the injector 5, than by correcting the fuel pressure, for accommodating the change in the fuel penetration of the fuel spray with respect to the injection timing.

Furthermore, the density of the gas in the combustion chamber 4 also depends on the temperature and pressure of the intake air. Thus, for accommodating the change in the penetration of the fuel spray due to the above, at least one of the pulse width (the continuous valve opening time) entered into the injector 5 and the fuel pressure is preferably corrected. That is, the density of the gas in the combustion chamber 4 is lowered for the higher temperature of the intake air, and the density of the gas in the combustion chamber 4 is increased for the higher pressure of the intake air, which cause the penetration of the fuel spray to vary. Especially, in the engine 1 equipped with the turbocharger 30 like the preferred embodiment of the present invention, the proper corrections are highly required for accommodating the great influence of the turbocharging on the pressure of intake air.

In view of the above, in the engine 1 of the preferred embodiment, at least one of the corrective controls should be executed as follows:

the pulse width entered into the injector 5 is corrected shorter for the higher temperature or the lower pressure of the intake air (charging pressure); and the fuel pressure is corrected lower for the higher temperature or the lower pressure of the intake air (charging pressure). Both are performed based on the signals from the intake-air pressure sensor 18 and the intake-air temperature sensor 24.

These prevent the fuel deposition on the wall surface while ensuring the preferable diffusion of the fuel spray, by compensating for the variation in density of the gas in the combustion chamber 4 resulting from the possible change in intake air temperature and the possible change in the charging pressure.

As describe above, the ECU 38 executes the prescribed control programs to perform the corrections of the number of divisions in the divided injection, the valve opening duration, the fuel pressure of the injector 5, and other control according to the injection timing by the injector 5, and the temperature and the pressure of intake air. In other words, the ECU comprises corrective controller 38f (means for controlling the injection), which corrects at least one of the valve opening duration and the fuel pressure, according to at least the density of the gas in the combustion chamber 4. For example, the valve opening duration of the injector 5 is correctively shortened or the fuel pressure is correctively reduced, for the smaller density of the gas.

The corrective controller 38f constitutes the injection control means in accordance with the present invention, in cooperation with the injection timing calculator 38c and the injector controller 38d. The injection control means injects the required amount of fuel in the divided manner with a plurality of shots using the injector controller 38d, when the amount of fuel injection Q corresponding to the required torque of the engine 1 is larger than the maximum amount of the fuel injection attainable within the allowable valve opening duration of the injector 5.

A control process of the engine 1 by the ECU 38 will now be described in detail with reference to the flowchart illustrated in FIG. 11. The control process mainly controls the valve opening duration of the injector 5 according to the injection timing and the temperature and pressure of intake gas in the compression stroke of the cylinder 2, while the engine 1 is in the premixed combustion region (H).

Figure 11:
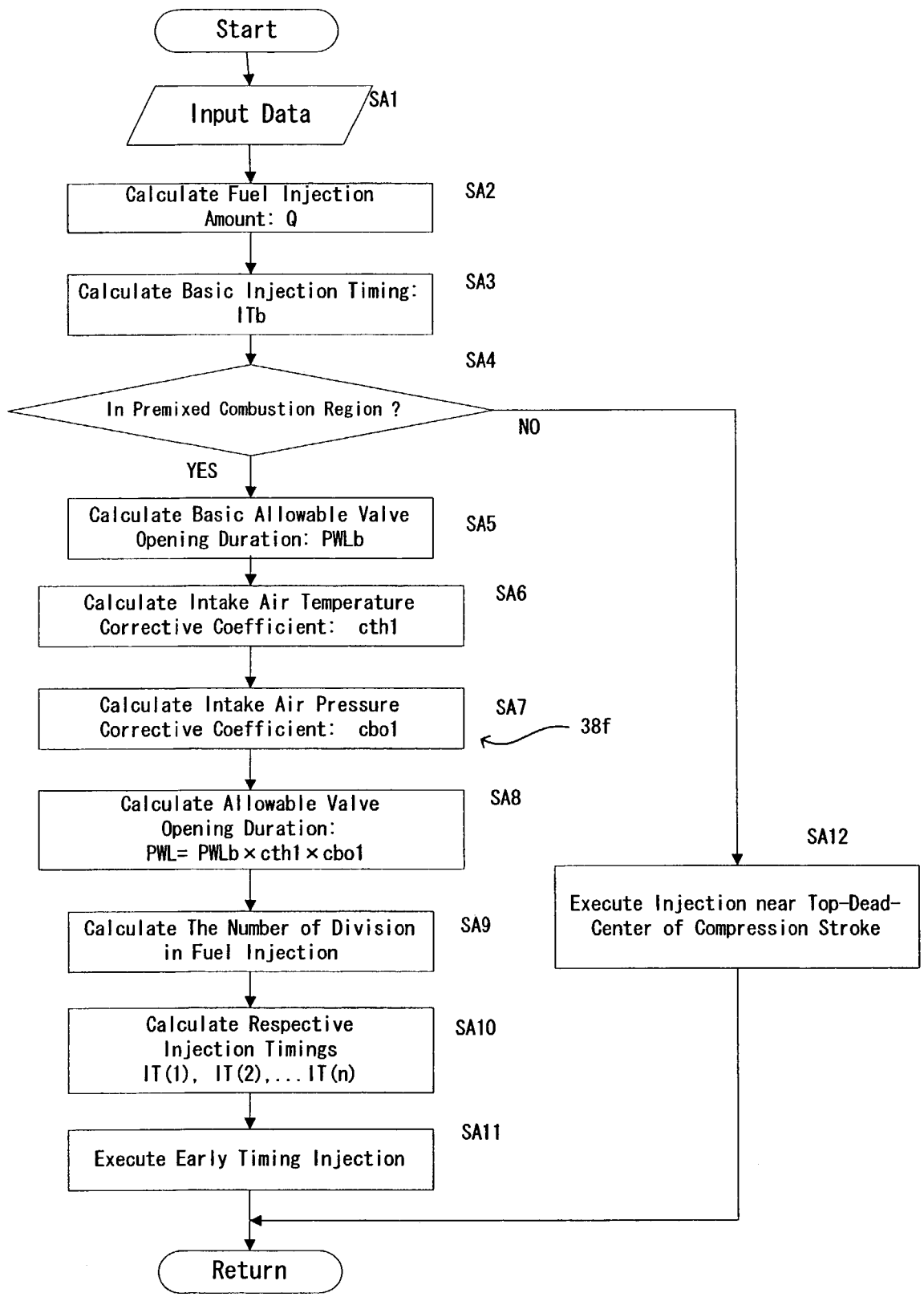
FIG. 11 is a flowchart illustrating an example of the fuel control process for mainly correcting the valve opening duration of the injector.

In FIG. 11, at step SA1 just after the start, at least an output signal of the fuel pressure sensor 7, an output signal of the crank angle sensor 11, an output signal of the intake air pressure sensor 18, an output signal of the air flow sensor 19, an output signal of intake air temperature sensor 24, an output signal of the acceleration sensor 39, and the other signals are inputted as data input. At the following step SA2, a target engine torque Trq is determined with reference to the target torque map (FIG. 8(a)) based on the engine rotational speed Ne calculated from the crank angle signal and the accelerator pedal position Acc. Additionally, at step SA2, a basic amount of fuel injection Qb is determined with reference to the fuel injection amount map (refer to FIG. 8(b)) based on the target engine torque Trq and the engine rotational speed Ne.

The basic amount of fuel injection Qb is compensated based on the coolant temperature and the ambient pressure to determine the amount of fuel injection Q. At step SA3, similarly, the basic injection timing ITb is determined with reference to the injection timing map (FIG. 8(c)) based on the target engine torque Trq and the engine rotational speed Ne.

Figure 12:
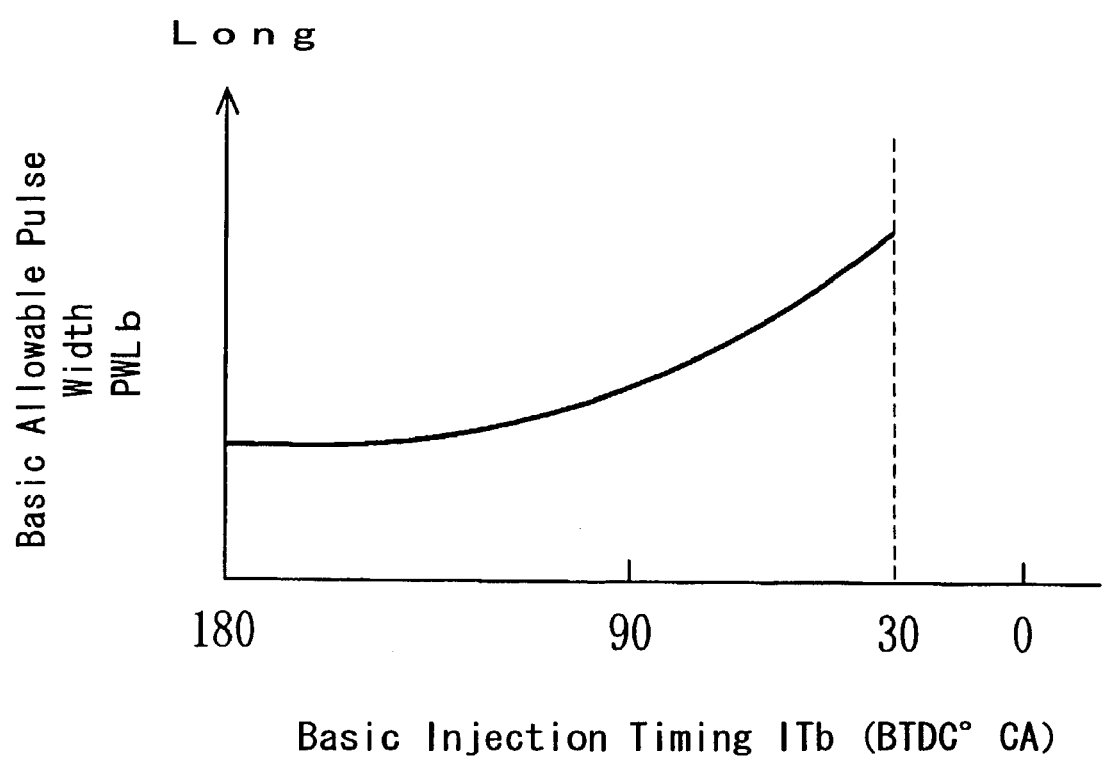
FIG. 12 is a graph showing an example of a table correlating the basic allowable pulse width of the injector with the injection timing.

Next, at step SA4, the combustion mode of the engine 1 is determined with reference to the combustion mode map (FIG. 4) based on the target engine torque Trq and the engine rotational speed Ne. That is, if the engine 1 is not in the premixed combustion region (H), i.e. NO at step SA4, the engine 1 is judged to be in the diffusion combustion region (D), then the sequence proceeds to step SA12 where a combustion mode dominated by the diffusion combustion is attained. If the engine 1 is in the premixed combustion region (H), i.e. YES at step SA4, a combustion mode dominated by the premixed combustion (the premixed compression ignition combustion mode) is attained. In particular, firstly at step SA5, a basic allowable pulse width PWLb corresponding to the allowable valve opening duration of the injector 5 is calculated. The calculation of the basic allowable pulse width PWLb is performed by reading a value of the basic allowable pulse width PWLb from the table shown in FIG. 12 by way of example, based on the basic injection timing ITb. This table empirically prescribes the proper allowable pulse width PWLb which accommodates the increase in temperature and density of the gas in the combustion chamber 6 resulting from the ascending of the piston 3 during the compression stroke of the cylinder 2.

Then, at steps SA6 and SA7, two corrective coefficients are calculated, which are to be used for correcting the basic allowable pulse width PWLb with reference to temperature and pressure of intake air, respectively.

Especially, at step SA6, with reference to the intake air temperature correction table shown in FIG. 13(a), the intake air temperature corrective coefficient cth1 is determined, which correctively shortens the pulse width for the higher intake-air temperature tha and correctively prolongs the pulse width for the lower intake-air temperature tha. At the following step SA7, with reference to the intake air pressure correction table shown in FIG. 13(b), the intake air pressure corrective coefficient cbo1 is determined, which correctively prolongs the pulse width for the higher intake-air pressure bo and correctively shortens the pulse width for the lower intake-air pressure bo.

Then, at step SA8, the basic allowable pulse width PWLb corresponding to the basic injection timing ITb is corrected using the intake air temperature corrective coefficient cth1 and the intake air pressure corrective coefficient cbo1 to determine the allowable pulse width PWL.

$$PWL = PWLB \times cth1 \times cbo1$$

The length of the basic allowable pulse width PWLb is corrected to compensate for the change in penetration of the fuel spray due to the changes in intake air temperature tha and intake air pressure bo, which provides the corrected value as the allowable pulse width PWL. The allowable pulse width PWL corresponds to the allowable valve opening duration in the case that the injector 5 starts fuel injection according to the basic injection timing ITb (the maximum valve opening duration which causes the fuel spray not to reach the inner wall of the cylinder 2).

Then, at step SA9, the pulse width PWn required for injecting all of the fuel at an early timing, so as to cause the premixed ignition compression combustion, is calculated based on the amount of the fuel injection Q, the basic injection timing ITb, and the detected value of the fuel pressure (the common rail pressure). The pulse width PWn and the allowable pulse width PWL are then used to determine the number of the fuel injection (the number of division). Especially, if the required pulse width PWn is shorter than the allowable pulse width PWL, the number of the fuel injections is determined to be one. If the required pulse width PWn is longer than the allowable pulse width PWL, the pulse width PWn is divided by the allowable pulse width PWL. If the calculation is divisible, its quotient is determined as the number of the injection n. If not divisible, the number added one to its quotient is determined as the number of the injection n.

Figure 14:
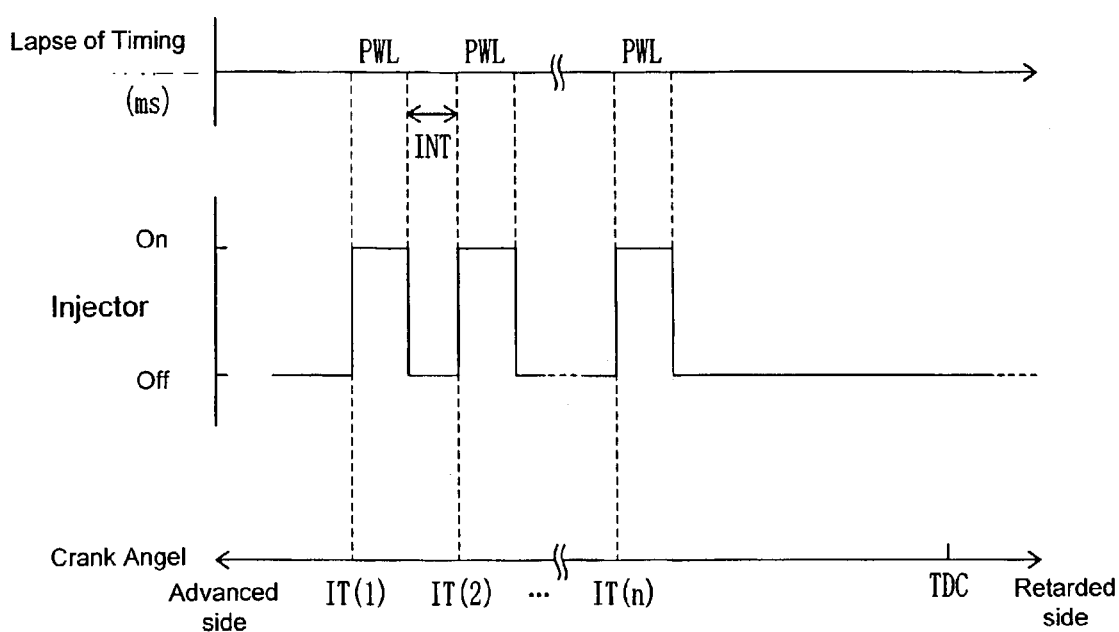
FIG. 14 is an illustrative time chart showing the relationship among the injection timing, the valve opening duration, and the interval of the valve closing period of the respective shots in divided injection.

Next, at step SA10, the actual injection timing IT(n) (n=1, 2 . . . ) is determined based on the required pulse width PWn and the number of injection n determined at step SA9. Especially, as schematically illustrated FIG. 14, the first time injection timing IT(1) is determined to the basic injection timing ITb. The second time injection timing IT(2) is determined by adding the allowable pulse width PWL and the predetermined injection interval INT required for the motion of a closing and opening of the injector 5 (for example 0.5 to several ms) to the basic injection timing ITb. That is, the second time injection timing IT(2) is set at the timing after IT(1) by crank angle range corresponding to the sum of IT(2) and INT. If the third time or more injection is to be performed, the injection timings IT(3), IT(4), . . . of them are determined according to the similar procedure. Then, at step SA11, the injector 5 performs the injections at the actual injection timings IT(n) (n=1, 2, . . . ) during the compression stroke of each cylinder 2, and the sequence returns.

While the engine 1 is operating in the premixed combustion region (H), the injector 5 injects fuel at an early timing within a predetermined crank angle during the compression stroke of the cylinder 2 so as to cause the premixed compressive ignition combustion. Furthermore, the valve opening duration of each injection operation by the injector 5 is limited to a duration shorter than the allowable valve opening duration so as to prevent the fuel injected at the early timing from reaching the inner wall of the cylinder 2.

At that time, according to the flow chart described above, the allowable pulse width PWn (allowable valve opening duration) is set so as to correspond to the first time valve opening timing of the injector, and, based on the pulse width PWn, the pulse width PW for the respective valve opening duration is set equal to or smaller than the allowable pulse width PWn. As shown in the graph chart of FIG. 10, however, the pressure and density of the gas in the combustion chamber 4 becomes higher and thus the allowable valve opening duration is prolonged as the crank angle retards. Thus, to accommodate this, the pulse width PW may be prolonged as the crank angle retards, that is, the second time pulse width is longer than the first time pulse width, and the third time pulse width is longer than the second time pulse width, for example. In this case, the pulse width PWn for the first injection operation may be set to the allowable pulse width PWn. The pulse width PWn for the second or more injection operations are preferably determined separately based on the crank angle at which the injection operation starts, in the same manner as the determination of the allowable pulse width PWn based on the start timing of the respective injection operation IT(n).

As described above, the respective valve opening durations for the plurality of divided shots are set such that a duration is longer than the preceding duration and shorter than the following duration, which increases the total amount of the fuel injection while substantially equalizing each of the penetration of the fuel spray corresponding to the respective valve opening durations.

This prevents the fuel from depositing on the inner surface of the cylinder 2 while ensuring the amount of fuel injection, thereby permitting the premixed compressive ignition combustion to occur in the extended condition including the operational condition of relatively higher load. In addition to the adjustment of the pulse width as described above, the adjustment of fuel pressure may be also performed.

On the other hand, if step SA4 judges the diffusion combustion region (D), the sequence proceeds to step SA12, where the injector 5 injects fuel at a timing near the top-dead-center of the compression stroke of the cylinder 2 to cause the conventional diesel combustion, then the sequence returns. At this time, the injector may be controlled to inject fuel in the amount corresponding to the injection amount Q in the one-shot manner at the basic injection timing ITb, or alternatively, to inject fuel in the amount in the divided manner with a plurality of shots which starts at a timing on the advanced side of the basic injection timing ITb. In addition, a small amount of fuel may be additionally injected during the expansion stroke of the cylinder 2.

In the flowchart shown in FIG. 11, each of steps SA5 through SA10 corresponds to the control procedure performed by the corrective controller 38f of the ECU 38. The corrective controller 38f divides the injection into a plurality of shots when the fuel injection amount Q for the target torque Trq (required torque for the engine 1) is larger than the amount attainable within the allowable pulse width PWL, and corrects the valve opening duration of the injector 5 for the respective divided injections according to the fuel injection timing and the temperature and pressure of the intake air.

Next, an alternative fuel control procedure will be described with reference to the flow chart shown in FIG. 15.

This fuel control procedure mainly corrects the fuel pressure according to the injection starting timing during the compression stroke of cylinder 2 and the temperature and pressure of intake air, while the engine 1 is in the premixed combustion region (H).

Figure 15:
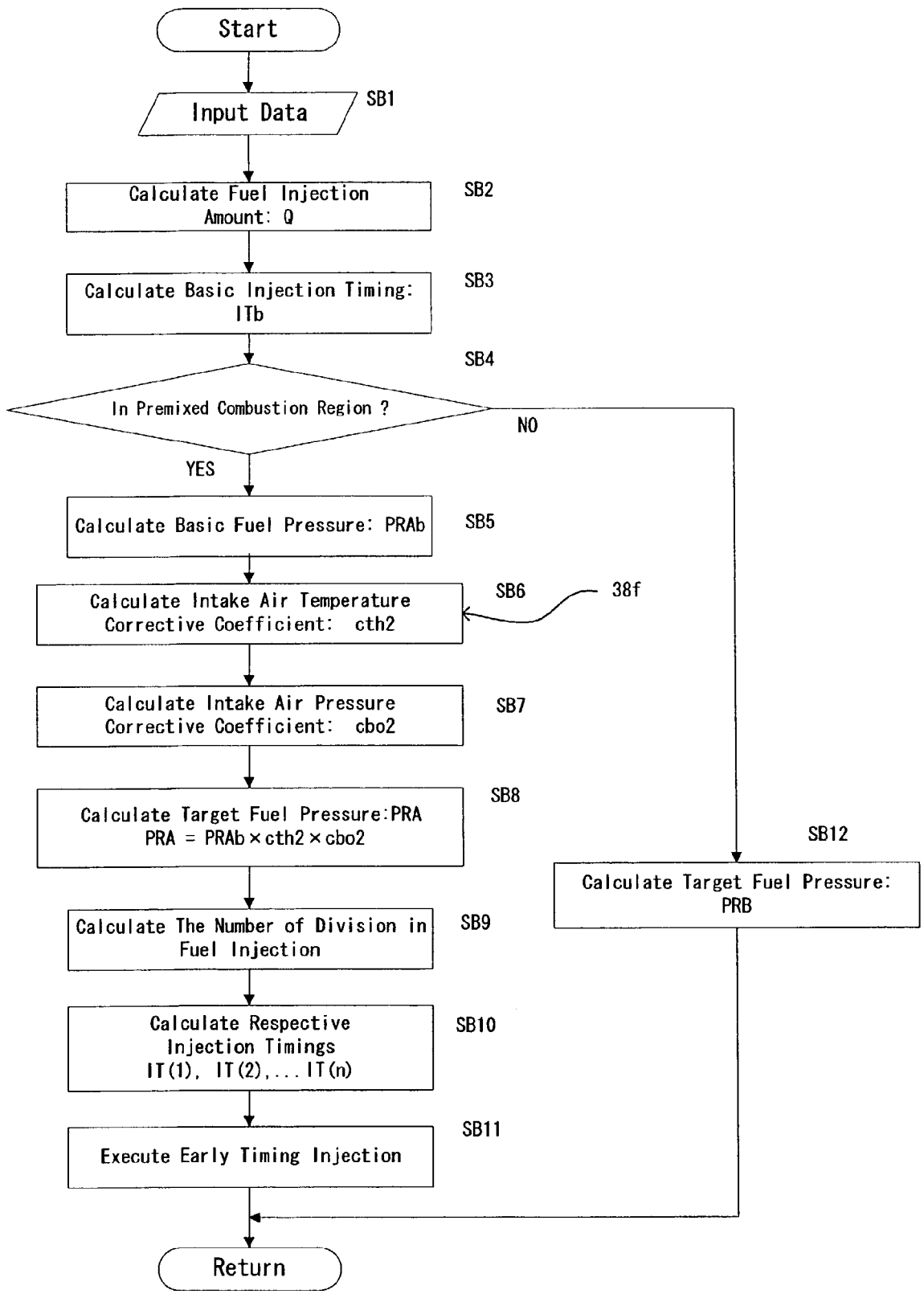
FIG. 15 is a flowchart illustrating an example of the fuel control process for mainly correcting the fuel pressure, corresponding to FIG. 11.

In FIG. 15, at steps SB1 through SB4 just after the start, the same control processes as steps SA1 through SA4 in the flowchart shown in FIG. 11 are performed. If step SB4 judges that the engine 1 is not in the premixed combustion region (H), that is, NO is judged (that is, the engine 1 is in the diffusion combustion region (D)), the sequence proceeds to step S12 described later, on the other hand, if the engine 1 is in the premixed combustion region (H), that is, YES is judged, the sequence proceeds to step SB5 where a desired basic value PRAb of the fuel injection pressure by the injector 5 is calculated. The basic fuel pressure is preferably determined by reading the basic fuel pressure PRAb from a table illustrated in FIG. 16 by way of example, based on the basic injection timing ITb calculated at step SB3. This table empirically prescribes the proper basic fuel pressure PRAb which is raised with the increase in the pressure and density of the gas in the combustion chamber 6 resulting from the ascending of the piston 3 in a predetermined range in the compression stroke of the cylinder 2 (BTDC 180 to 30 degree CA in the drawing).

Then, at steps SB6 and SB7, two corrective coefficients are read from tables. The corrective coefficients are used for correcting the basic fuel pressure PRAb according to the temperature and pressure of intake air. Especially, at step SB6, with reference to the intake air temperature correction table shown in FIG. 17(a), the intake air temperature corrective coefficient cth2 is determined, which correctively lowers the fuel pressure for the higher intake-air temperature Tha and correctively raises the fuel pressure for the lower intake-air temperature Tha. At the following step SB7, with reference to the intake air pressure correction table shown in FIG. 17(b), the intake air pressure corrective coefficient cbo2 is determined, which correctively raises the fuel pressure for the higher intake-air pressure Bo and correctively lowers the fuel pressure for the lower intake-air pressure Bo.

Then, at step SB8, the basic fuel pressure PRAb corresponding to the basic injection timing ITb is corrected using the intake air temperature corrective coefficient cth2 and the intake air pressure corrective coefficient cbo2 to determine a target fuel pressure PRA serving as a target value for the control.

$$(PRA = PBAb \times cth2 \times cbo2)$$

The basic target control value of fuel pressure (basic fuel pressure PRAb) is corrected to compensate for the change in penetration of the fuel spray due to the changes in intake air temperature and intake air pressure, which provides the corrected value as the target control value.

Then, at step SB9, the pulse width PWn required for injecting all of the fuel at an early timing, so as to cause the premixed ignition compression combustion is calculated based on the amount of the fuel injection Q, the basic injection timing ITb, and the actual fuel pressure (the detected value of the fuel pressure).

The pulse width PWn and the predetermined pulse width PWm are then used to determine the number of the fuel injection (divisions). Especially, if the required pulse width PWn is shorter than the predetermined pulse width PWm, the number of the fuel injection divisions is determined to be one. If the required pulse width PWn is longer than the predetermined pulse width PWmL, the pulse width PWn is divided by the predetermined pulse width PWm. If the calculation is divisible, its quotient is determined as the number of the injection divisions n. If not divisible, the number obtained by adding one to its quotient is determined as the number of the injection divisions n.

Figure 16:
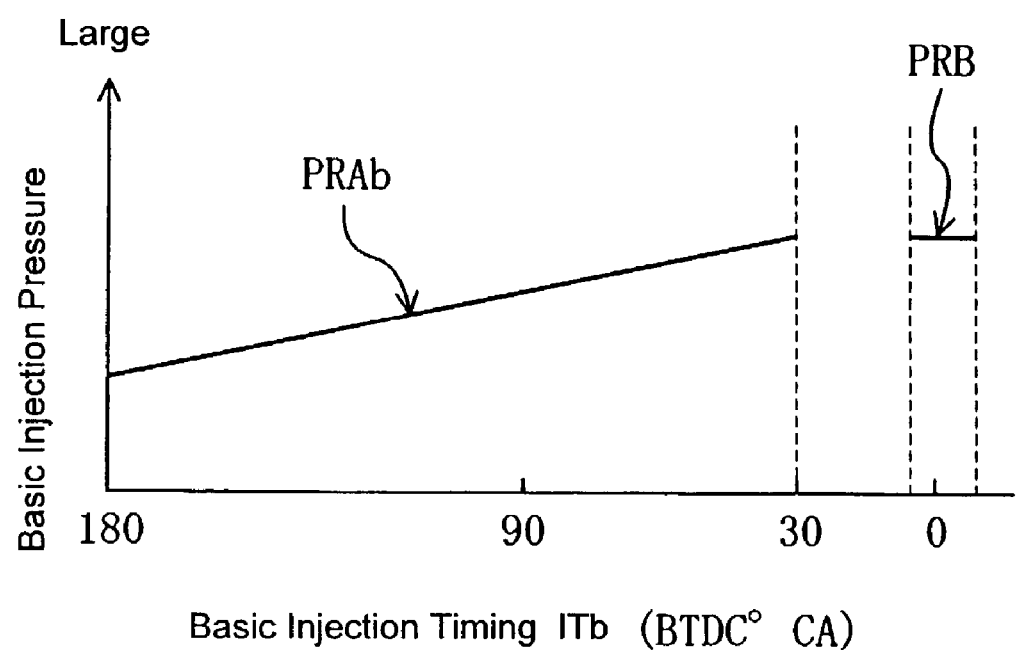
FIG. 16 is a diagram showing an example of a table correlating the basic fuel pressure of the injector with the injection timing.

The predetermined pulse width PWm corresponds to the predetermined valve opening duration which causes the fuel spray not to reach the inner wall of the cylinder 2, in the case that the fuel pressure is controlled on the basis of the table of the basic fuel pressure PRAb (refer to FIG. 16).

Next, at step SB10, the actual injection timing IT (n) (n=1, 2 . . . ) is determined based on the required pulse width PWn and the number of injection divisions n determined at step SB9, being similar to step SA10 in the flow chart in FIG. 11. Then, at step SB11, the injector 5 performs the injections at the actual injection timings IT(n) (n=1, 2, . . . ) during the compression stroke of each cylinder 2 and the sequence returns.

That is, while the engine 1 is operating in the premixed combustion region (H), the injector 5 injects fuel at an early timing during the compression stroke of the cylinder 2 so as to cause the premixed compressive ignition combustion. Furthermore, the fuel injection pressure by the injector 5 is adjusted based on the injection timing and the temperature and pressure of intake air so as to prevent the fuel injected at the early timing from reaching the inner wall of the cylinder 2. The predetermined pulse width may not be a fixed value as described above. For example, because the pressure and density of the gas in the combustion chamber 4 becomes higher and thus the penetration of the fuel spray is reduced as the crank angle retards, to accommodate this, the pulse width PW may be shortened as the crank angle advances and prolonged as the crank angle retards.

On the other hand, if step SB4 judges the diffusion combustion region (D), the sequence proceeds to step SB12, where the basic fuel pressure PRB is read from the table illustrated in FIG. 16 and determined as the target fuel pressure, then at step SB11, the injector 5 injects fuel in a one-shot manner at the timing (the basic injection timing) ITb near the top-dead-center of the compression stroke of the cylinder 2, and then, the sequence returns. In the table shown in FIG. 16, for the basic fuel pressure, the basic pressure PRB is set to so high a pressure value that the required amount of fuel is injected and diffused over the combustion chamber 4 even with the highly pressured and highly dense gas in the combustion chamber 4 at a timing near the top-dead-center of the compression stroke of the cylinder 2.

The fuel spray preferably causes the diffusion combustion continuously after the initial premixed combustion, thereby providing high engine output for high engine load.

In the flowchart shown in FIG. 15, each of steps SB5 through SB10 corresponds to the control procedure performed by the corrective controller 38f of the ECU 38. The corrective controller 38f divides the injection into a plurality of shots when the fuel injection amount Q for the target torque Trq (required torque for the engine 1) is larger than the amount attainable within the predetermined pulse width PWm, and corrects the fuel injection pressure of the injector 5 for the respective divided shots according to the fuel injection timing and the temperature and pressure of the intake air.

Therefore, in accordance with the combustion control apparatus for a diesel engine according to one embodiment of the present invention, when the engine 1 is in the premixed combustion region (H) on lower load side, the EGR valve 35 is opened to recirculate the relatively considerable amount of exhaust gas into the intake passage 16, and the injector 5 disposed so as to extend into the combustion chamber 4 of the cylinder 2 and start injecting fuel within the predetermined crank angle range (BTDC 180 to 30 degree CA) during the compression stroke of the cylinder 2, and then the injected fuel is widely diffused over the combustion chamber 4 to sufficiently mix with intake air (including fresh air and recirculated exhaust gas), thereby forming highly homogeneous fuel mixture.

In the mixture, the oxidization in relatively low temperature (that is, cool flame) progresses at the portion with the high density of fuel vapor and oxygen. In this case, however, the density of fuel and oxygen is low as a whole because the considerable amount of exhaust gas (carbon dioxide and the other gas), being larger than air (that is, nitrogen, oxygen and the other) in heat capacity, is included in the mixture. Further, the heat of reaction in cool flame is absorbed by carbon dioxide being large in heat capacity, so that the shift to the high temperature oxidization (that is, ignition) is prevented, which prolongs the ignition delay time.

When the cylinder 2 approaches the top-dead-center of the compression stroke, and the gas temperature in the combustion chamber 4 further rises and the density of the fuel and oxygen sufficiently increases, the mixture simultaneously ignites and combusts.

At this time, because the fuel vapor, air, and recirculated exhaust gas in the mixture have sufficiently mixed with one another, especially, cool flame reaction has proceeded at the portion of fuel high in density, there is hardly any portion of fuel which is unduly high in density in the mixture, which prevents soot generation.

Moreover, because the distribution of the fuel vapor is homogeneous in the mixture as described above and a considerable amount of carbon dioxide and other gas are homogeneously diffused, abrupt heat generation is prevented from occurring locally in the mixture in spite of the simultaneous combustion of the mixture. Moreover, the combustion heat is absorbed by surrounding carbon dioxide, which suppresses the rise in combustion temperature, thereby significantly reducing NOx generation.

Further, in the embodiment of the present invention, when the injector 5 injects fuel during the compression stroke of the cylinder 2 as described above, at least one of the valve opening duration and the injection pressure by injector 5 is controlled according to the density or pressure of the gas in the combustion chamber 4, such that the valve opening duration of the injector 5 is shortened or the fuel pressure is lowered as the density of the gas in the combustion chamber 4 decreases, and, if required, fuel injection is performed in the divided manner with a plurality of shots.

This prevents the fuel spray from reaching the inner surface of the cylinder, which avoids the degradation in fuel efficiency and the increase in the amount of harmful components in exhaust gas due to the fuel deposition on the wall surface, even when the hole-nozzle type injector 5 for generating the fuel spray being relatively large in fuel penetration is used and starts injecting fuel into the gas with relative low pressure and low density in the combustion chamber 4.

It should be appreciated that the invention is not limited to the embodiments as described above. For example, in the forgoing embodiments, while the engine 1 is operating at least on the high load side in the premixed combustion region (H), the divided injection may be performed with longer valve opening duration of the injector 5 or higher fuel pressure than the case with the same number of division in the divided injection under the operational condition on the lower load side.

This provides for a relatively small number of divisions in the divided injection at least on the high load side in the premixed combustion region (H), which reduces the integrated variations in the amount of fuel injected during the fuel injection operation corresponding to the reduced number of the divisions, thereby reducing the variations in the total fuel amount even with the large amount of fuel to be injected.

Additionally, the injector 5 may inject fuel in the divided manner with two or more shots, whenever the engine 1 is in the premixed combustion region (H), so as to prevent the fuel injected at an early timing from depositing on the wall surface.

Further, although in the foregoing embodiments, the injector 5 starts injecting fuel within the predetermined crank angle range during the compression stroke of the cylinder 2 to cause the premixed compression ignition combustion, the invention is not limited to this configuration. For example, the fuel injection may start at the intake stroke of the cylinder 2.

Moreover, in the forgoing embodiments, although the engine 1 is equipped with the turbocharger 30, the invention may be applied to a diesel engine with mechanically driven supercharger, or a diesel engine without a charging device.

As described above, according to the combustion control apparatus for the diesel engine in accordance with the embodiment of the invention, there is provided a direct-injection diesel engine which controls the injector to inject fuel at the early timing at least in one of the intake stroke and the compression stroke of the cylinder so as to cause the combustion in which the ratio of the premixed combustion is larger than that of the diffusion combustion in a predetermined operational condition, wherein, at least one of the period during which the injector opens its valve (valve opening duration) at the early timing injection, and the injection pressure of the fuel injected by the injector, is adjusted at least based on the density of the gas in the combustion chamber so as to prevent the penetration of the fuel spray from becoming unduly strong. Accordingly, the fuel deposition on the inner wall of the cylinder is prevented, avoiding the degradation in fuel efficiency and the increase in the amount of harmful components in exhaust gas.

Furthermore, the control apparatus controls the engine to attain the first combustion state in which the ratio of the premixed combustion is larger than that of the diffusion combustion in a predetermined operational region on the low load side, and the second combustion configuration in which the ratio of the diffusion combustion is larger than that of the premixed combustion in the region except for the predetermined operational region, wherein, the early injection in the predetermined operational region is performed in the divided manner into a plurality of shots. Accordingly, the fuel injected at the early timing is prevented from depositing on the wall surface, even with the hole type nozzle which inherently provides large penetration of fuel spray.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A combustion control apparatus for a diesel engine comprising:
    an injector disposed so as to extend into a combustion chamber of a cylinder of the engine, and
    an injection control means for controlling the injector to inject fuel at least during one of the intake stroke and compression stroke, so as to attain a first combustion state where the ratio of a premixed combustion is larger than that of a diffusion combustion, while the engine is in a predetermined operational condition, wherein,
    said injection control means adjusts at least one of a period during which the injector opens its valve and the injection pressure of the fuel injected by the injector, at least based on a fuel injection timing, while the engine is in the predetermined operational condition, and
    said injection control means performs at least one of the controls of shortening the valve opening duration of the injector as the fuel injection timing is advanced, and lowering the injection pressure as the fuel injection timing is advanced.

2. A combustion control apparatus for a diesel engine as defined in claim 1, wherein,
    said injection control means controls the injector to inject fuel in a divided manner with a plurality of shots, when an amount of the fuel injection corresponding to a required torque exceeds a maximum fuel injection amount attainable within a valve opening duration of the injector.

3. A combustion control apparatus for a diesel engine as defined in claim 2, wherein
    said injection control means controls the injector so that the valve opening durations for the respective divided shots are prolonged for a more retarded crank angle.

4. A combustion control apparatus for a diesel engine as defined in claim 1, further comprising,
    an exhaust gas recirculation passage for recirculating a part of exhaust gas into an intake passage of the engine,
    an exhaust gas recirculation amount regulator valve for adjusting the amount of the recirculated exhaust gas through the exhaust gas recirculation passage, and an exhaust gas recirculation control means for controlling the opening of the exhaust gas recirculation amount regulator valve.

5. A combustion control apparatus for a diesel engine as claimed in claim 1, wherein,
    said fuel injection control means controls the injector to inject fuel during the intake stroke or during the compression stroke, so as to cause the first combustion configuration while the engine is in a first region defined on the low load side, and to inject fuel at a timing near the top-dead-center of the compression stroke, so as to cause a second combustion configuration where the ratio of the diffusion combustion is larger than that of the premixed combustion while the engine is in a second region different than the first region.

6. A combustion control apparatus for a diesel engine as claimed in claim 5, wherein,
    said injector is provided with a hole-type nozzle.

7. A combustion control apparatus for a diesel engine as claimed in claim 5 wherein,
    the engine is equipped with a charging device for charging intake air, and
    said injection control means controls the injector to inject fuel in a divided manner with a plurality of divided shots while the engine is in a higher engine load side defined on the first predetermined operational condition region, and performs at least one of controls wherein the valve opening duration is more prolonged than that having the same number of divisions in the divided injection under the operational condition on the lower load side; and the injection pressure is larger than that having the same number of divisions in the divided injection under the operational condition on the lower load side.

8. A combustion control apparatus for a diesel engine comprising:
    an injector disposed so as to extend into a combustion chamber of a cylinder of the engine, and
    an injection control means for controlling the injector to inject fuel at least during one of the intake stroke and compression stroke, so as to attain a first combustion state where the ratio of a premixed combustion is larger than that of a diffusion combustion, while the engine is in a predetermined operational condition, wherein,
    there is provided an intake air temperature detecting means for detecting intake air temperature,
    said injection control means adjusts at least one of a period during which the injector opens its valve and the injection pressure of the fuel injected by the injector, at least based on the intake air temperature detected by the intake air temperature detecting means, while the engine is in the predetermined operational condition, and
    said injection control means performs at least one of the controls of shortening the valve opening duration of the injector for a higher temperature detected by the intake air temperature detecting means, and lowering injection pressure for the higher temperature detected by the intake air temperature detecting means.

9. A combustion control apparatus for a diesel engine as defined in claim 8 wherein,
    said injection control means controls the injector to inject fuel in a divided manner with a plurality of shots, when an amount of the fuel injection corresponding to a required torque exceeds a maximum fuel injection amount attainable within a valve opening duration of the injector.

10. A combustion control apparatus for a diesel engine as defined in claim 9 wherein said injection control means controls the injector so that the valve opening durations for the respective divided shots are prolonged for a more retarded crank angle.

11. A combustion control apparatus for a diesel engine as defined in claim 8 further comprising, an exhaust gas recirculation passage for recirculating a part of exhaust gas into an intake passage of the engine, an exhaust gas recirculation amount regulator valve for adjusting the amount of the recirculated exhaust gas through the exhaust gas recirculation passage, and an exhaust gas recirculation control means for controlling the opening of the exhaust gas recirculation amount regulator valve.

12. A combustion control apparatus for a diesel engine as claimed in claim 8 wherein, said fuel injection control means controls the injector to inject fuel during the intake stroke or during the compression stroke, so as to cause the first combustion configuration while the engine is in a first region defined on the low load side, and to inject fuel at a timing near the top-dead-center of the compression stroke, so as to cause a second combustion configuration where the ratio of the diffusion combustion is larger than that of the premixed combustion while the engine is in a second region different than the first region.

13. A combustion control apparatus for a diesel engine as claimed in claim 12 wherein, said injector is provided with a hole-type nozzle.

14. A combustion control apparatus for a diesel engine as claimed in claim 12, wherein, the engine is equipped with a charging device for charging intake air, and said injection control means controls the injector to inject fuel in a divided manner with a plurality of divided shots while the engine is in a higher engine load side defined on the first predetermined operational condition region, and performs at least one of controls wherein the valve opening duration is more prolonged than that having the same number of divisions in the divided injection under the operational condition on the lower load side; and the injection pressure is larger than that having the same number of divisions in the divided injection under the operational condition on the lower load side.

15. A combustion control apparatus for a diesel engine comprising:

an injector disposed so as to extend into a combustion chamber of a cylinder of the engine, and an injection control means for controlling the injector to inject fuel at least during one of the intake stroke and compression stroke, so as to attain a first combustion state where the ratio of a premixed combustion is larger than that of a diffusion combustion, while the engine is in a predetermined operational condition, wherein, there is provided an intake air pressure detecting means for detecting the pressure of intake air, said injection control means adjusts at least one of a period during which the injector opens its valve and the injection pressure of the fuel injected by the injector, at least based on the intake air pressure detected by the intake air pressure detecting means, while the engine is in the predetermined operational condition, and said fuel injection control means performs at least one of the controls of shortening the valve opening duration for a lower pressure detected by the intake air pressure detecting means, and lowering the injection pressure for the lower pressure detected by the intake air pressure detecting means.

16. A combustion control apparatus for a diesel engine as defined in claim 15 wherein, said injection control means controls the injector to inject fuel in a divided manner with a plurality of shots, when an amount of the fuel injection corresponding to a required torque exceeds a maximum fuel injection amount attainable within a valve opening duration of the injector.

17. A combustion control apparatus for a diesel engine as defined in claim 16, wherein said injection control means controls the injector so that the valve opening durations for the respective divided shots are prolonged for a more retarded crank angle.

18. A combustion control apparatus for a diesel engine as defined in claim 15, further comprising, an exhaust gas recirculation passage for recirculating a part of exhaust gas into an intake passage of the engine, an exhaust gas recirculation amount regulator valve for adjusting the amount of the recirculated exhaust gas through the exhaust gas recirculation passage, and an exhaust gas recirculation control means for controlling the opening of the exhaust gas recirculation amount regulator valve.

19. A combustion control apparatus for a diesel engine as claimed in claim 15, wherein, said fuel injection control means controls the injector to inject fuel during the intake stroke or during the compression stroke, so as to cause the first combustion configuration while the engine is in a first region defined on the low load side, and to inject fuel at a timing near the top-dead-center of the compression stroke, so as to cause a second combustion configuration where the ratio of the diffusion combustion is larger than that of the premixed combustion while the engine is in a second region different than the first region.

20. A combustion control apparatus for a diesel engine as claimed in claim 19 wherein, said injector is provided with a hole-type nozzle.

21. A combustion control apparatus for a diesel engine as claimed in claim 19 wherein, the engine is equipped with a charging device for charging intake air, and said injection control means controls the injector to inject fuel in a divided manner with a plurality of divided shots while the engine is in a higher engine load side defined on the first predetermined operational condition region, and performs at least one of controls wherein the valve opening duration is more prolonged than that having the same number of divisions in the divided injection under the operational condition on the lower load side; and the injection pressure is larger than that having the same number of divisions in the divided injection under the operational condition on the lower load side.

* * * * *